US012656449B2

(12) United States Patent
Zorgui et al.

(10) Patent No.: US 12,656,449 B2
(45) Date of Patent: Jun. 16, 2026

(54) PER-PANEL RF SENSING TRANSMISSION AND MEASUREMENT OPERATIONS

(71) Applicant: QUALCOMM Incorporated, San Diego, CA (US)

(72) Inventors: Marwen Zorgui, San Diego, CA (US); Mohammed Ali Mohammed Hirzallah, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/340,784

(22) Filed: Jun. 23, 2023

(65) Prior Publication Data

US 2024/0426969 A1 Dec. 26, 2024

(51) Int. Cl.
| | |
|---|---|
| *G01S 7/00* | (2006.01) |
| *G01S 7/03* | (2006.01) |
| *H04L 5/00* | (2006.01) |

(52) U.S. Cl.
CPC ............... *G01S 7/003* (2013.01); *G01S 7/03* (2013.01); *H04L 5/0048* (2013.01)

(58) Field of Classification Search
CPC ....... H04W 24/10; H04W 4/38; H04W 72/20; H04W 72/21; H04W 92/18; H04W 24/02; H04W 88/02; H04W 8/24; H04W 16/28; H04W 7/006; H04W 13/88; G01S 7/006; G01S 13/003; G01S 7/003; G01S 7/03; H04B 7/0695; H04B 7/0617; H04B 7/06952; H04B 7/0691; H04B 7/0413
See application file for complete search history.

(56) References Cited

U.S. PATENT DOCUMENTS

| | | | |
|---|---|---|---|
| 11,509,369 B2 | 11/2022 | Ji et al. | |
| 11,889,462 B2* | 1/2024 | Park | G01S 13/48 |
| 2021/0167821 A1 | 6/2021 | Chen et al. | |
| 2024/0324032 A1* | 9/2024 | Li | H04W 4/38 |
| 2025/0093487 A1* | 3/2025 | Walker | G01S 13/003 |
| 2025/0168684 A1* | 5/2025 | Mandelli | H04W 24/10 |

FOREIGN PATENT DOCUMENTS

WO 2022205056 A1 10/2022

OTHER PUBLICATIONS

International Search Report and Written Opinion—PCT/US2024/ 030248—ISA/EPO—Sep. 13, 2024.

* cited by examiner

*Primary Examiner* — Olumide Ajibade Akonai
(74) *Attorney, Agent, or Firm* — Procopio, Cory, Hargreaves & Savitch LLP

(57) ABSTRACT

Aspects presented herein may improve radio frequency (RF) sensing accuracy for an RF sensing node by enabling the RF sensing node to perform RF sensing using multiple antenna/ antenna panels. In one aspect, a UE transmits, to a sensing entity, an indication of a capability to perform RF sensing using a set of antenna panels. The UE receives, from the sensing entity based on the indication, a configuration to perform an RF sensing operation using a subset of antenna panels in the set of antenna panels, where each antenna panel in the subset of antenna panels is configured to perform a corresponding RF sensing operation for each antenna panel. The UE performs, based on the configuration, the RF sensing operation via each antenna panel in the subset of antenna panels.

30 Claims, 13 Drawing Sheets

Monostatic Sensing
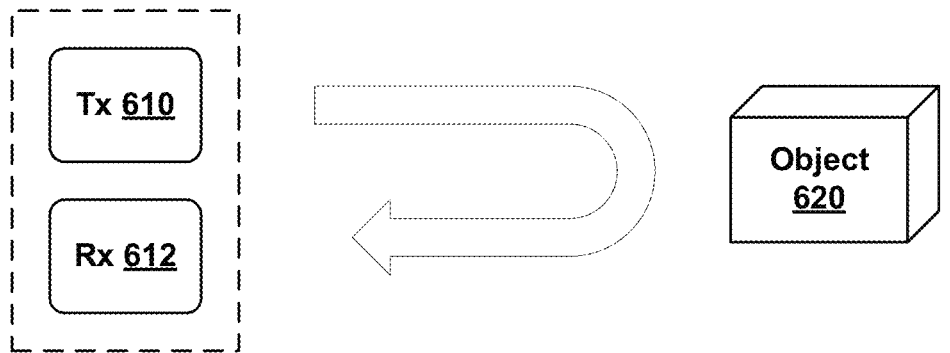
FIG. 6A
Bistatic/Multistatic Sensing
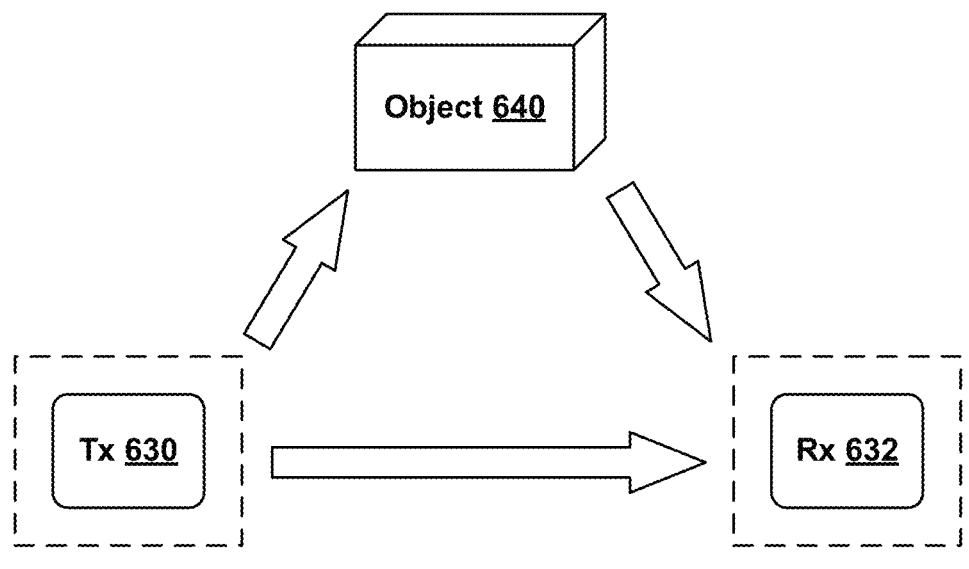
FIG. 6B

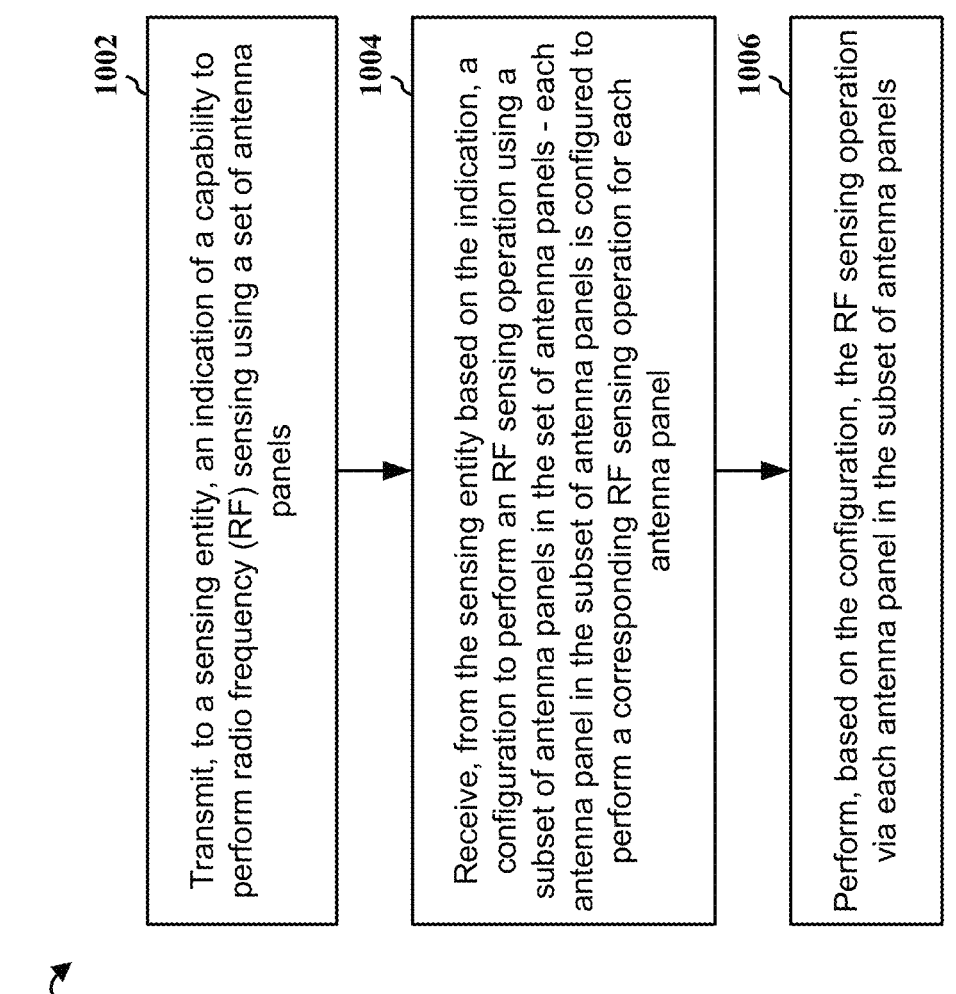

1000

1002

Transmit, to a sensing entity, an indication of a capability to perform radio frequency (RF) sensing using a set of antenna panels

1004

Receive, from the sensing entity based on the indication, a configuration to perform an RF sensing operation using a subset of antenna panels in the set of antenna panels - each antenna panel in the subset of antenna panels is configured to perform a corresponding RF sensing operation for each antenna panel

1006

Perform, based on the configuration, the RF sensing operation via each antenna panel in the subset of antenna panels

FIG. 10

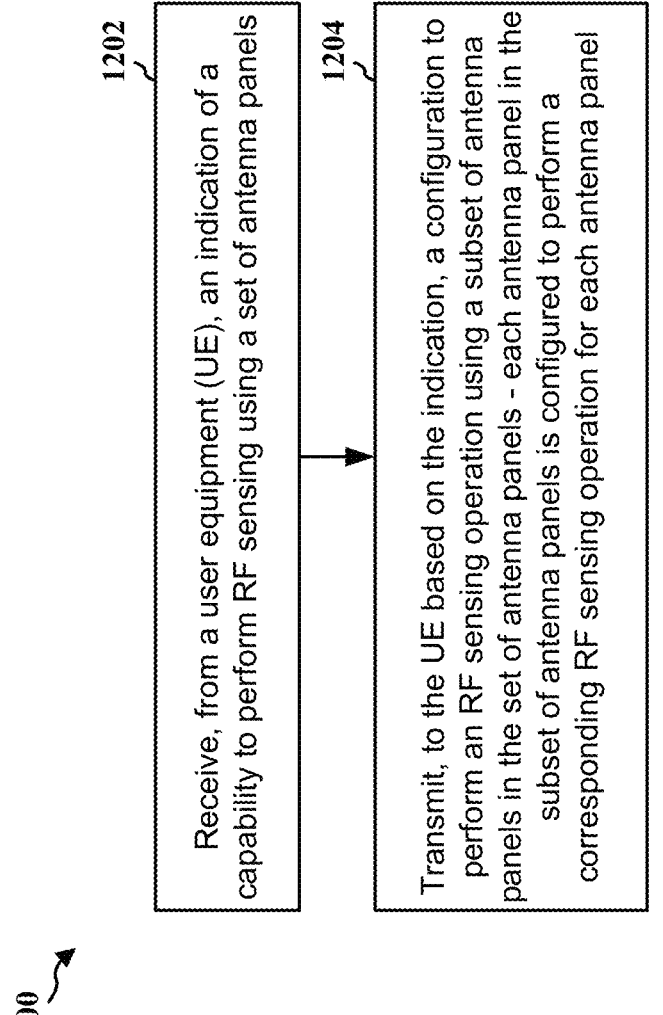

1202

Receive, from a user equipment (UE), an indication of a capability to perform RF sensing using a set of antenna panels

1204

Transmit, to the UE based on the indication, a configuration to perform an RF sensing operation using a subset of antenna panels in the set of antenna panels - each antenna panel in the subset of antenna panels is configured to perform a corresponding RF sensing operation for each antenna panel

PER-PANEL RF SENSING TRANSMISSION AND MEASUREMENT OPERATIONS

TECHNICAL FIELD

The present disclosure relates generally to communication systems, and more particularly, to a wireless communication involving radio frequency (RF) sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits, to a sensing entity, an indication of a capability to perform radio frequency (RF) sensing using a set of antenna panels. The apparatus receives, from the sensing entity based on the indication, a configuration to perform an RF sensing operation using a subset of antenna panels in the set of antenna panels, where each antenna panel in the subset of antenna panels is configured to perform a corresponding RF sensing operation for each antenna panel.

The apparatus performs, based on the configuration, the RF sensing operation via each antenna panel in the subset of antenna panels.

In an aspect of the disclosure, a method, a computer-readable medium, and an apparatus are provided. The apparatus receives, from a user equipment (UE), an indication of a capability to perform RF sensing using a set of antenna panels. The apparatus transmits, to the UE based on the indication, a configuration to perform an RF sensing operation using a subset of antenna panels in the set of antenna panels, where each antenna panel in the subset of antenna panels is configured to perform a corresponding RF sensing operation for each antenna panel.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6A is a diagram illustrating an example monostatic sensing mode in accordance with various aspects of the present disclosure.

FIG. 6B is a diagram illustrating an example bistatic sensing mode in accordance with various aspects of the present disclosure.

FIG. 10 is a flowchart of a method of wireless communication.

FIG. 12 is a flowchart of a method of wireless communication.

DETAILED DESCRIPTION

Figure 1:
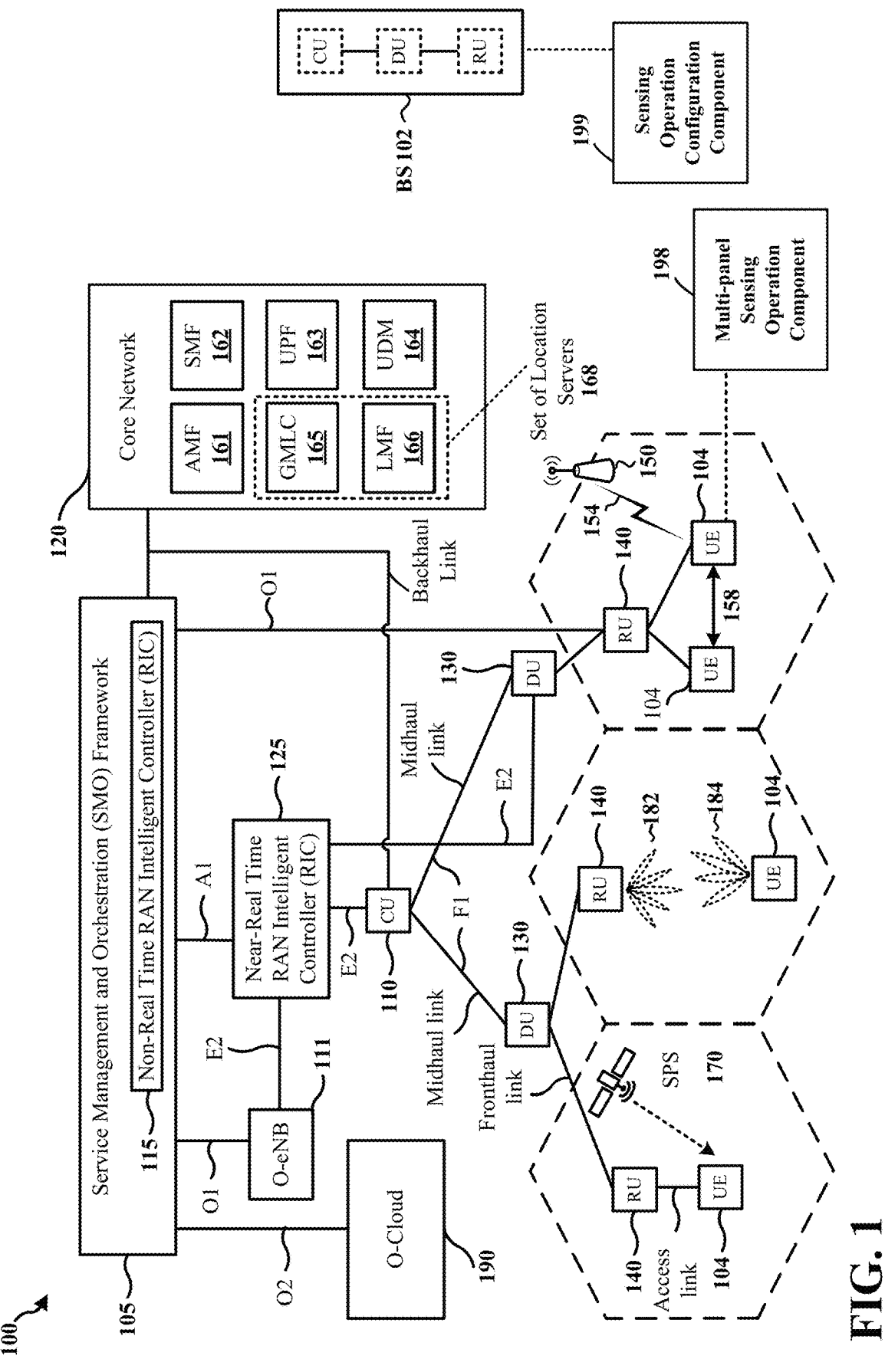
FIG. 1 is a diagram illustrating an example of a wireless communications system and an access network.

Aspects presented herein may improve radio frequency (RF) sensing accuracy for an RF sensing node by enabling the RF sensing node to perform RF sensing using multiple antenna/antenna panels. Aspects presented herein also provide configuration and capability signaling for RF sensing nodes with multiple antenna/antenna panels to enable multi-panel/multi-antenna activation for the RF sensing nodes, such that each antenna/antenna panel of an RF sensing node (e.g., a UE, a transmission reception point (TRP), a vehicle UE, etc.) may be activated independent of each other. Aspects presented herein may also enable an RF sensing node to use multiple antennas/antenna panels for UL sensing reference signal transmissions and receptions, which may be referred to as multi-panel operations or multi-panel sensing operations for purposes of the present disclosure.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (ENB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a multi-panel sensing operation component 198 that may be configured to transmit, to a sensing entity, an indication of a capability to perform RF sensing using a set of antenna panels; receive, from the sensing entity based on the indication, a configuration to perform an RF sensing operation using a subset of antenna panels in the set of antenna panels, where each antenna panel in the subset of antenna panels is configured to perform a corresponding RF sensing operation for each antenna panel; and perform, based on the configuration, the RF sensing operation via each antenna panel in the subset of antenna panels.

In certain aspects, the base station 102 may include a sensing operation configuration component 199 that may be configured to receive, from a UE, an indication of a capability to perform RF sensing using a set of antenna panels; and transmit, to the UE based on the indication, a configuration to perform an RF sensing operation using a subset of antenna panels in the set of antenna panels, where each antenna panel in the subset of antenna panels is configured to perform a corresponding RF sensing operation for each antenna panel.

Figures 2A, 2B, 2C, 2D:
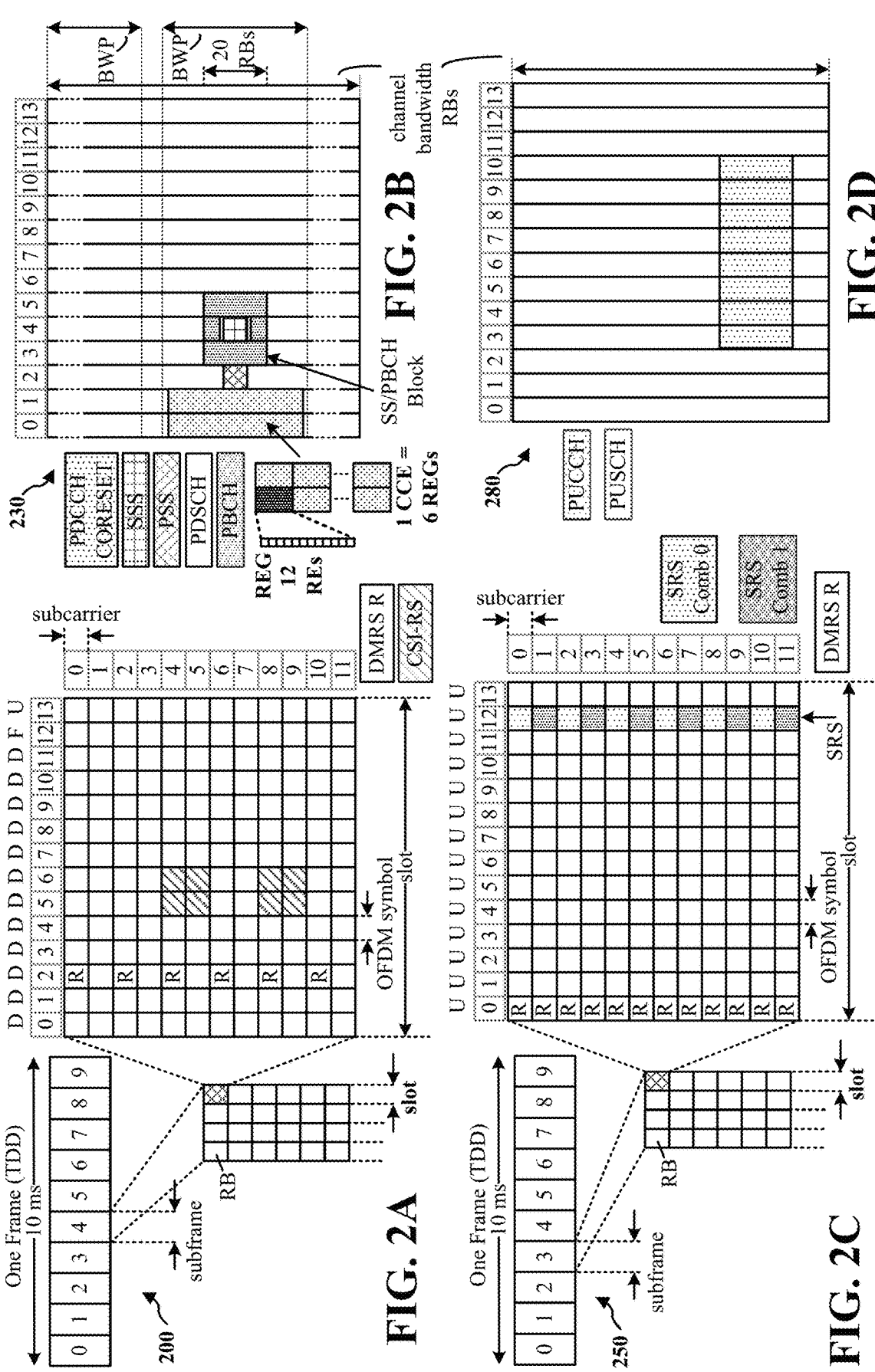
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
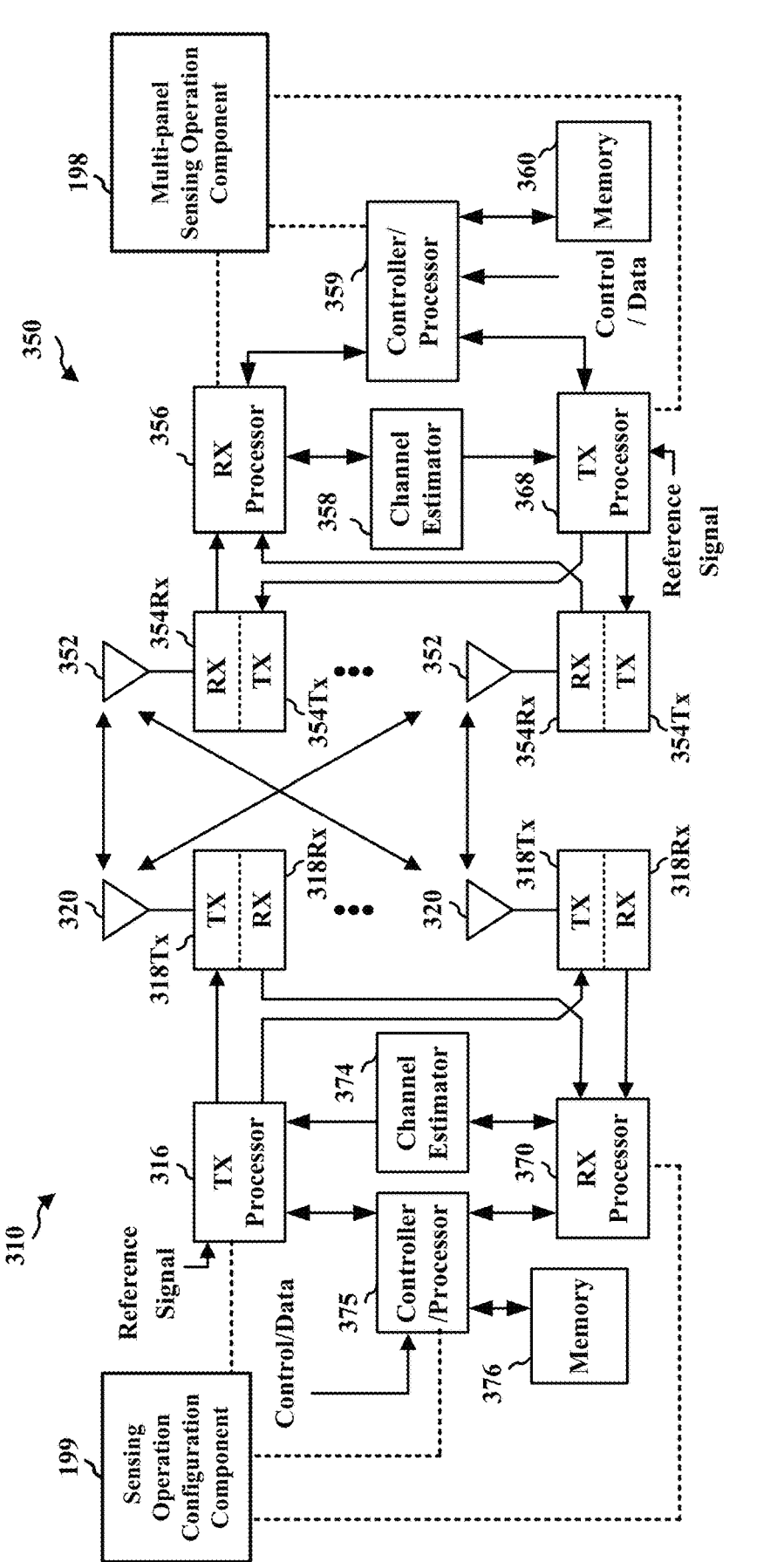
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the multi-panel sensing operation component 198 of FIG. 1.

At least one of the TX processor 316, the RX processor 370, and the controller/processor 375 may be configured to perform aspects in connection with the sensing operation configuration component 199 of FIG. 1.

Figure 4:
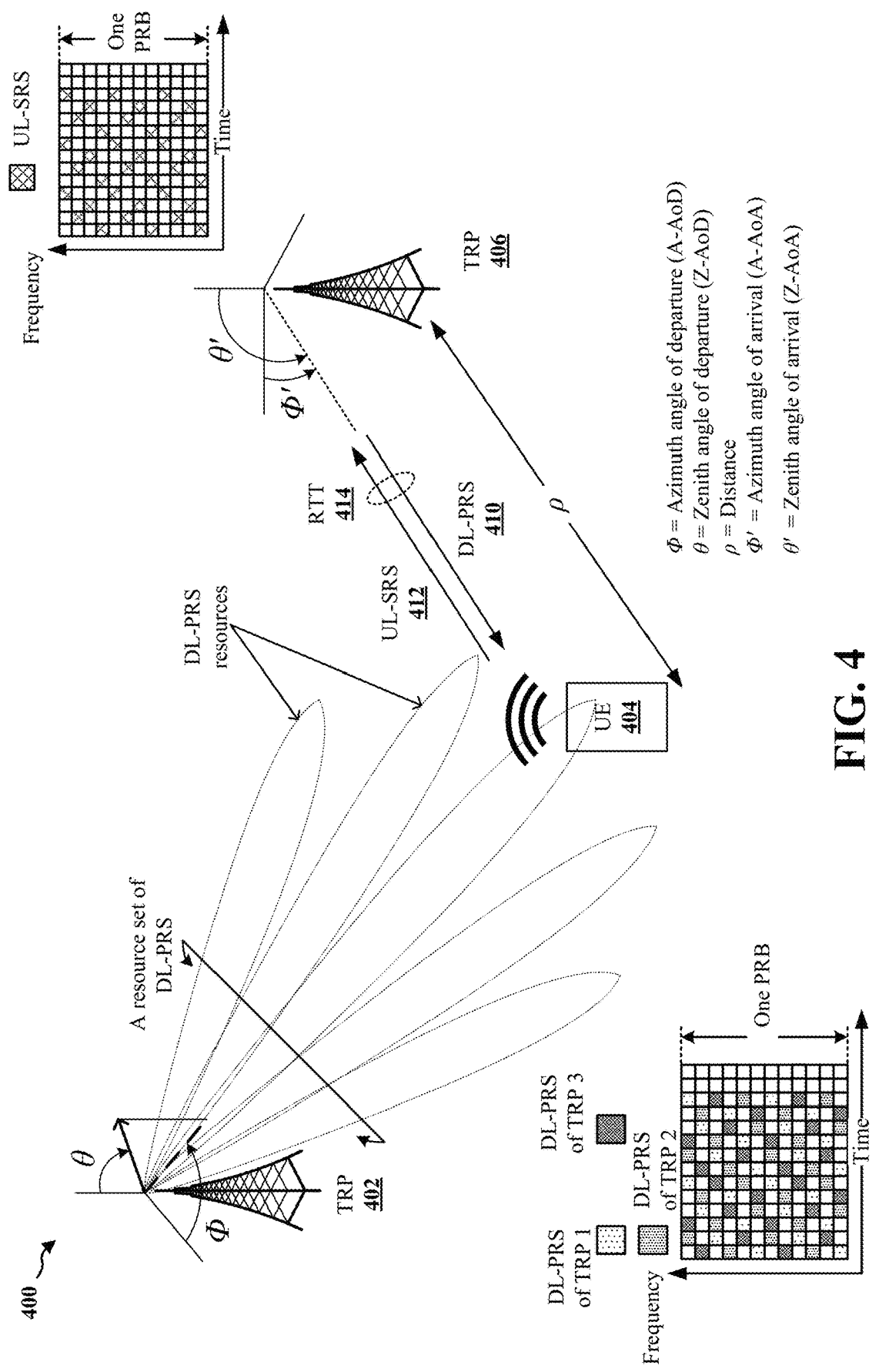
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine enhance to and/or to certainty, supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS. SSS. SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In addition to network-based and GNSS-based positioning technologies, a wireless device (e.g., a TRP, a base station, a component of the base station, a UE, etc.) may also be configured to include radar capabilities, which may be referred to as "radio frequency (RF) sensing" and/or "cellular-based RF sensing." For example, a wireless device may transmit radar reference signals (RRSs) and measure the RRSs reflected from one or more objects. Based at least in part on the measurement of the reflected RRSs, the wireless device may determine or estimate a distance (and/or a direction) between the wireless device and the one or more objects. In another example, a first wireless device may also receive RRSs transmitted from a second wireless device, where the first wireless device may determine or estimate a distance (and/or a direction) between the first wireless device and the second wireless device based at least in part on the received RRS. As such, in some examples, RF sensing techniques may be used for UE positioning and/or for assisting UE positioning. For purposes of the present disclosure, a device that is capable of performing RF sensing (e.g., transmitting and/or receiving RRS for detecting an object or for estimating the distance between the device and the object) may be referred to as a "sensing node" or an "RF sensing node." For example, a sensing node/RF sensing node may be a UE, a base station, a component of the base station, a TRP, a device capable of transmitting RRS, and/or a device configured to perform radar functions, etc. In some examples, the term "sensing node" and "RF sensing node" may also be used interchangeably with the term "radar." A RF sensing measurement may refer to any measurements that are associated with RF sensing.

Figure 5:
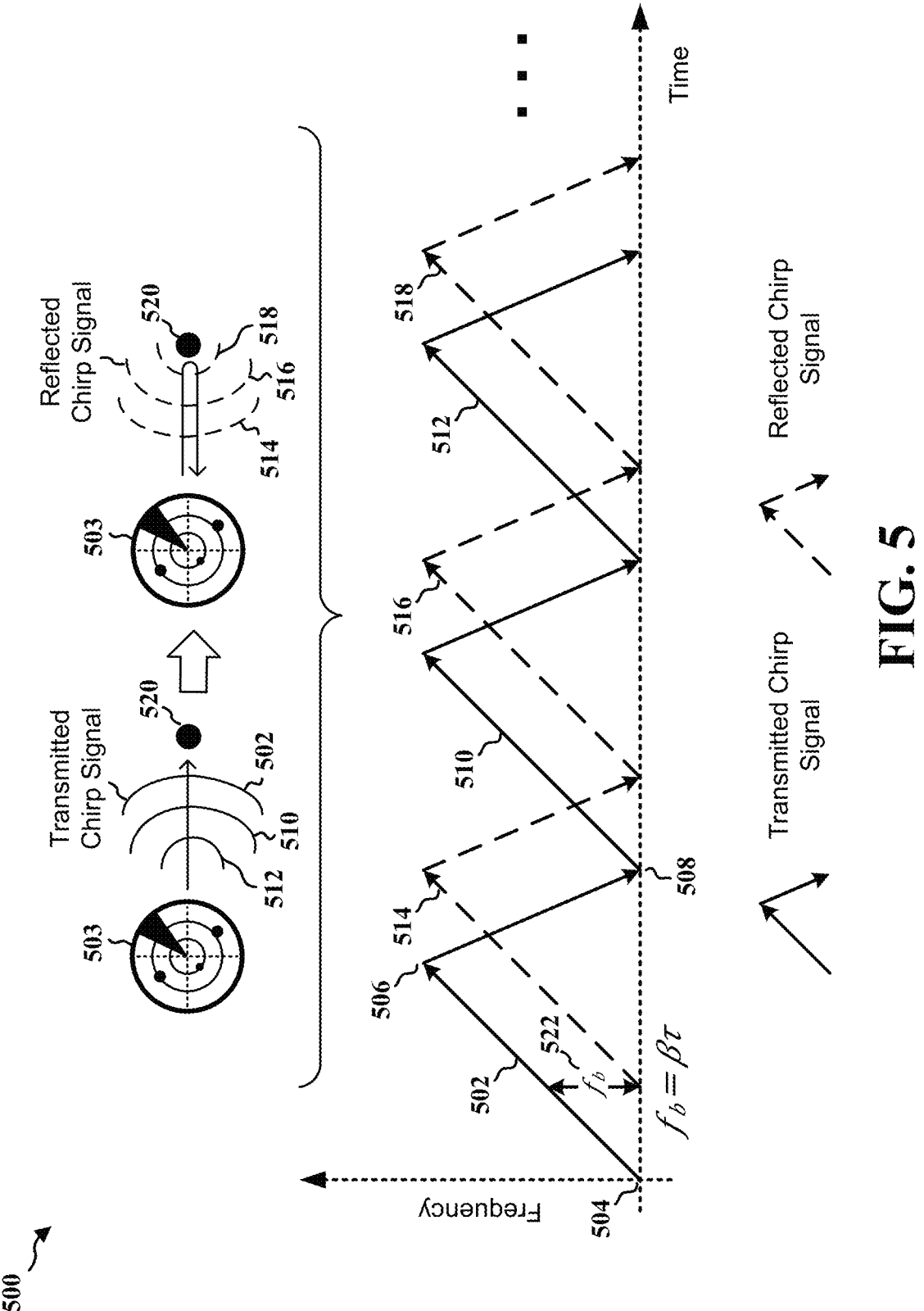
FIG. 5 is a diagram illustrating an example radar signal generated from a radio frequency (RF) sensing node in accordance with various aspects of the present disclosure.

FIG. 5 is a diagram 500 illustrating an example radar signal (e.g., RRS) generated from an RF sensing node in accordance with various aspects of the present disclosure. An RF sensing node 503 may detect an object 520 (e.g., the location, the distance, the direction, and/or the speed of the object 520 with respect to the RF sensing node 503) by transmitting RRS towards the object 520 and receiving the RRS reflected (e.g., bounce off) from the object 520. In some examples, the object 520 may be a radar receiver or have a capability to receive and process RRS.

In one example, the RRS may be a chirp signal that includes a frequency that varies linearly (e.g., has a frequency sweeping) over a fixed period of time (e.g., over a sweep time) by a modulating signal. For example, as shown by the diagram 500, a transmitted chirp signal 502 may have a starting frequency at 504 of a sinusoid. Then, the frequency may gradually (e.g., linearly) increase on the sinusoid until it reaches an ending (or highest) frequency at 506 of the sinusoid, and then the frequency of the signal may return to the starting frequency as shown at 508 and another chirp signal 510 may be transmitted in the same way. In other words, each chirp signal may include an increase in frequency (e.g., linearly) and a drop in frequency or vice versa (e.g., including a decrease in frequency and then an increase in frequency), such that the RF sensing node 503 may transmit chirp signals sweeping in frequency. In some examples, such chirp signal may also be referred to as a frequency modulated continuous wave (FMCW).

After a chirp signal (e.g., chirp signals 502, 510, 512, etc.) is transmitted by the RF sensing node 503, the transmitted chirp signal may reach the object 520 and reflect back to the RF sensing node 503, such as shown by the reflected chirp signals 514, 516, and 518, which may correspond to the transmitted chirp signals 502, 510, and 512, respectively. As there may be a distance between the RF sensing node 503 and the object 520 and/or it may take time for a transmitted chirp signal to reach the object 520 and reflect back to the RF sensing node 503, a delay may exist between a transmitted chirp signal and its corresponding reflected chirp signal. As this delay may be proportional to a range between the RF sensing node 503 and the object 520 (e.g., the further the target, the larger the delay and vice versa), the RF sensing node 503 may be able to measure or estimate a distance between the RF sensing node 503 and the object 520 based on the delay.

In some examples, the RF sensing node 503 may also measure a difference in frequency between the transmitted chirp signal and the reflected chirp signal, which may also be proportional to the distance between the RF sensing node 503 and the object 520. In other words, as the frequency difference between the reflected chirp signal and the transmitted chirp signal increases with the delay, and the delay is linearly proportional to the range, the distance of the object 520 from the RF sensing node 503 may also be determined based on the difference in frequency. Thus, the reflected chirp signal from the object 520 may be mixed with the transmitted chirp signal and down-converted to produce a beat signal which may be linearly proportional to the range after demodulation. For example, the RF sensing node 503 may determine a beat signal 522 by mixing the transmitted chirp signal 502 and its corresponding reflected chirp signal 514. While examples in the diagram 500 illustrate using an FMCW waveform for the RRS, other types of radar waveforms may also be used by the RF sensing node 503 for the RRS.

In some implementations, RF sensing may be categorized into two modes: a monostatic sensing mode and a bistatic sensing mode (which may also be referred to as "monostatic RF sensing" and "bistatic/multi-static RF sensing," respectively). FIG. 6A is a diagram 600A illustrating an example monostatic sensing mode in accordance with various aspects of the present disclosure. Under monostatic sensing, the transmitter component and the receiver component of the RF sensor are co-located, such as in the same UE or radar. For example, a transmitter 610 and a receiver 612 may be located at a same device, where the transmitter 610 may transmit radar signals that reflect off of an object 620 and are received by the receiver 612. Thus, the transmission and reception of the radar signals may be performed by one device.

FIG. 6B is a diagram 600B illustrating an example bistatic sensing mode in accordance with various aspects of the present disclosure. Under bistatic sensing, the transmitter component and the receiver component may be widely separated (e.g., on different UEs/locations). For example, the transmitter 630 of a first device may transmit radar signals, and the radar signals and radar signals reflected off of an object 640 may be received by the receiver 632 of a second device. In one example, the bistatic sensing may be suitable for network-based UE positioning where PRS is used for the positioning. In another example, the bistatic sensing may also be suitable for channel estimation, where DMRS may be used by a device for estimating the condition of a channel.

In some implementations, RF sensing may enable a network to determine characteristic(s) of object(s) in an environment. For example, RF sensing may enable a network to determine the range, the angle, and/or the radial velocity of one or more objects with respect to one or more TRPs. In some examples, the RF sensing may also enable the network to determine the absolute position/velocity of the one or more objects, and/or the shape/dimensions of the one or more objects. The network may determine the characteristic(s) of object(s) via a set of RS sensing nodes, such as a set of UEs, a set of TRPs, or a combination thereof.

Figure 7:
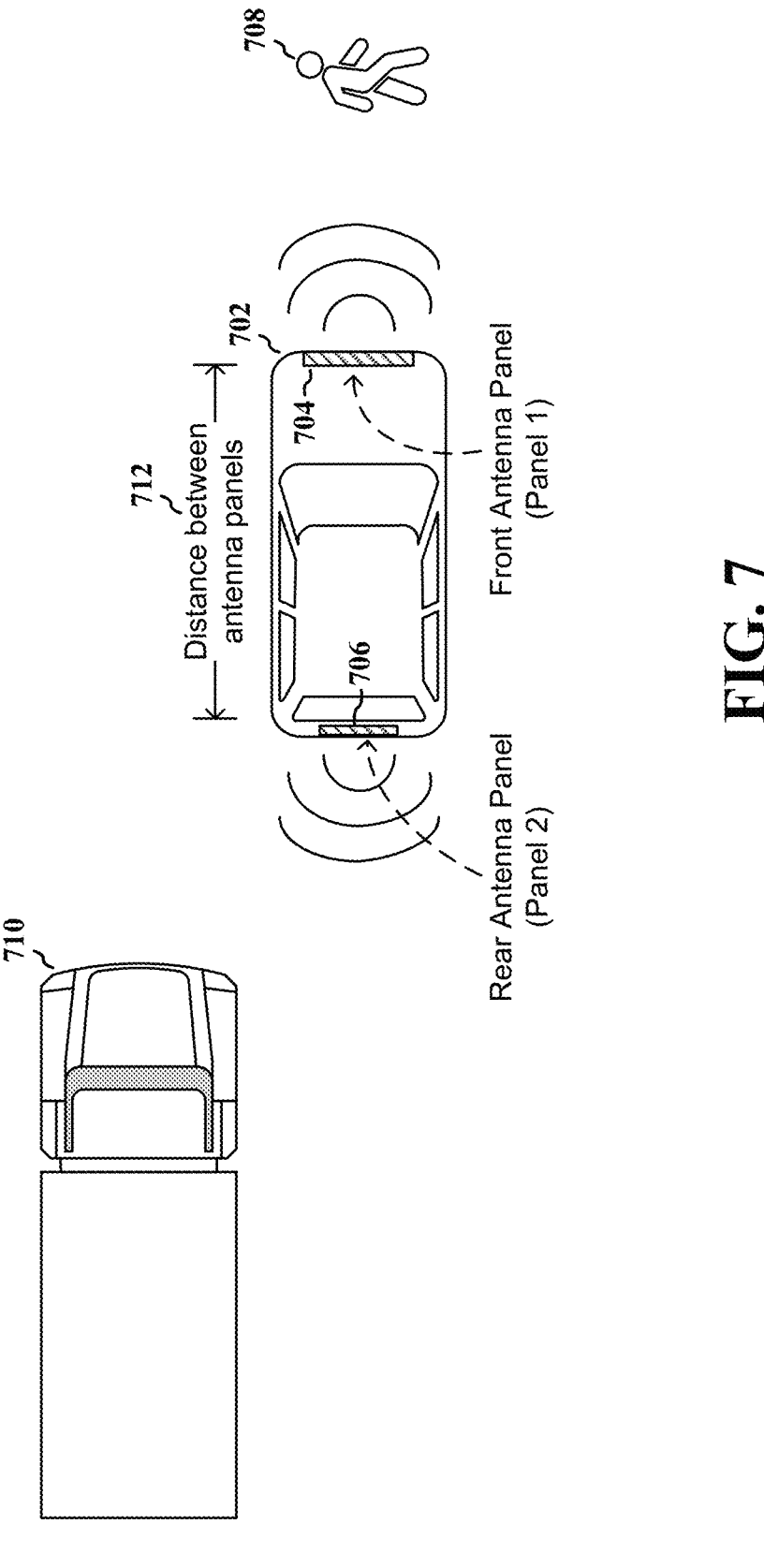
FIG. 7 is a diagram illustrating an example of an RF sensing node with multiple antenna panels in accordance with various aspects of the present disclosure.

FIG. 7 is a diagram 700 illustrating an example of an RF sensing node with multiple antenna panels in accordance with various aspects of the present disclosure. As shown by the diagram 700, some types of UEs, such as a vehicle UE 702 (e.g., a UE that is a vehicle, or a vehicle with UE capabilities such as wireless communication capabilities, etc.), may be equipped with multiple (e.g., two or more) antenna panels (or antennas), where the distance between the antenna panels/antennas may be considerably and/or meaningfully large (e.g., exceeding a defined distance threshold) from a positioning and/or RF sensing perspective. For example, the vehicle UE 702 may include two antenna panels: a front antenna panel 704 and a rear antenna panel 706. If the vehicle UE 702 is sensing objects in the front (e.g., a pedestrian 708), the sensing may be more accurate when the vehicle UE 702 is using the front antenna panel 704 compared to using the rear antenna panel 706 (as there may be less obstacles and the RF sensing is based on line-of-sight (LOS)). Similarly, if the vehicle UE 702 is sensing objects in the rear/back (e.g., a truck 710), the sensing may be more accurate when the vehicle UE 702 is using the rear antenna panel 706 compared to using the front antenna panel 704.

In some examples, as shown at 712, when the distance between multiple antenna panels of the vehicle UE 702 is significant/meaningful (e.g. is above a distance threshold), the vehicle UE 702 may perform sidelink (SL) positioning using multiple antenna panels (may also be referred to as a multi-panel UE operation), which may result in an improved positioning accuracy. For example, the vehicle UE 702 may perform sidelink (SL) positioning/communication with another vehicle UE using both front and rear antenna panels, and the vehicle UE 702 may be able to estimate the distance and/or the direction of the another vehicle UE with higher accuracy compared to just using one antenna panel.

Figure 8:
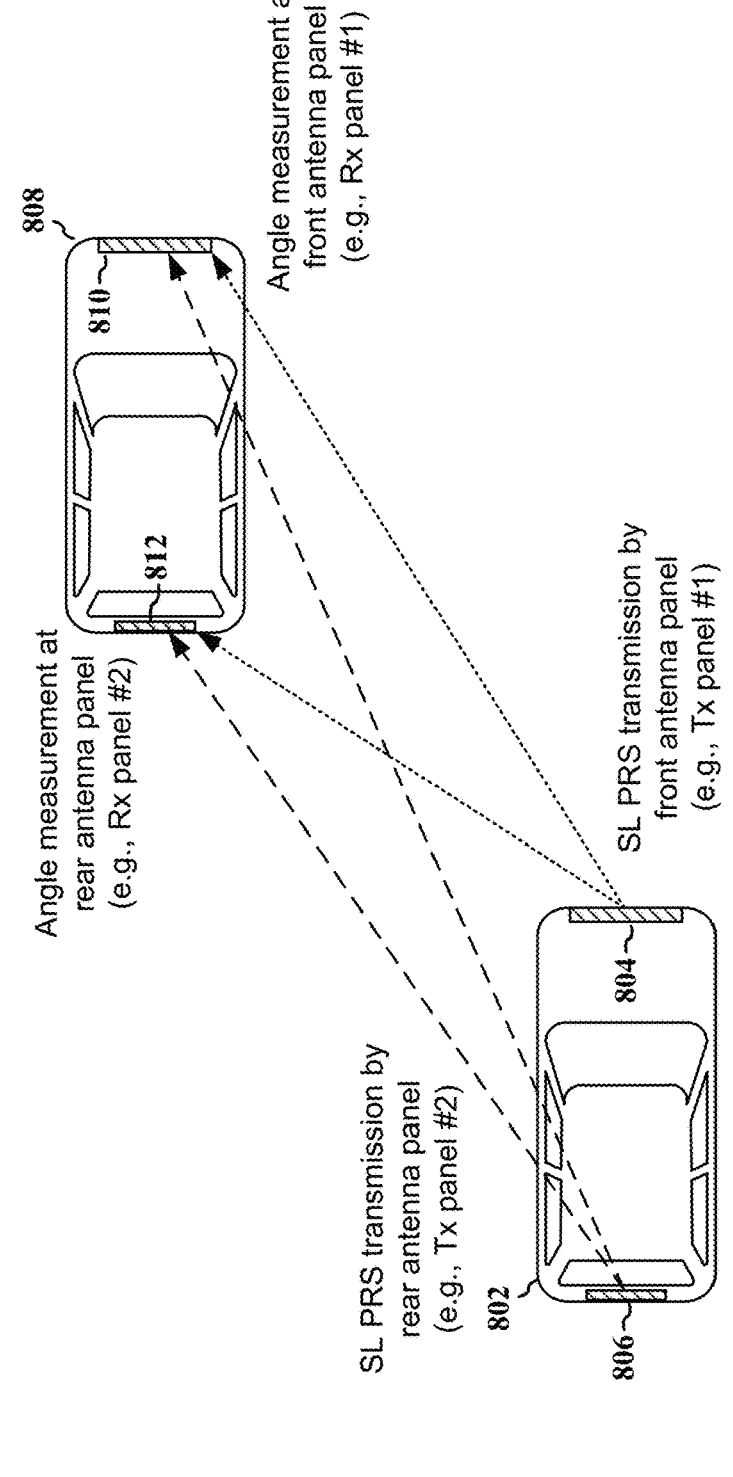
FIG. 8 is a diagram illustrating an example sidelink (SL) positioning between vehicles with multiple antenna panels in accordance with various aspects of the present disclosure.

FIG. 8 is a diagram 800 illustrating an example SL positioning between vehicles with multiple antenna panels in accordance with various aspects of the present disclosure. When a vehicle UE is equipped/associated with at least two antennas or antenna panels, each antenna/antenna panel of the vehicle UE may be considered as an individual anchor node (e.g., an individual/independent Tx/Rx component). If there are multiple vehicle UEs and each of the multiple vehicle UEs is equipped with at least two antennas or antenna panels, a vehicle UE in the multiple vehicle UEs may be configured to perform SL positioning based on reference signal time difference (RSTD) measurement per receive antenna for a specific set of SL positioning reference signals (PRS) transmitted from two different antennas/antenna panels (e.g., from two anchor nodes) of another vehicle UE.

For example, a first vehicle UE 802 may include a front antenna panel 804 and a rear antenna panel 806, and a second vehicle UE 808 may include a front antenna panel 810 and a rear antenna panel 812. During an SL positioning session, the first vehicle UE 802 may be configured to transmit a set of PRSs from both of its front antenna panel 804 and rear antenna panel 806. Then, the second vehicle UE 808 may be configured to receive the set of PRSs using both of its front antenna panel 810 and rear antenna panel 812 and measure the angle of the set of PRS received at each of its front antenna panel 810 and rear antenna panel 812. This may enable the second vehicle UE 808 to determine the position of the first vehicle UE 802 (e.g., the relative position of the first vehicle UE 802 with respect to the second vehicle UE 808) with higher accuracy. In some examples, the second vehicle UE 802 may be specified to have the capability to cancel the time offset between different receive antennas (e.g., between its front antenna panel 810 and rear antenna panel 812) in order to support the RSTD measurement(s) between different receive antennas with respect to an antenna/antenna panel of another UE or a single anchor UE (e.g., a UE/vehicle UE with just one antenna/antenna panel).

Aspects presented herein may improve RF sensing accuracy for an RF sensing node by enabling the RF sensing node to perform RF sensing using multiple antenna/antenna panels. Aspects presented herein also provide configuration and capability signaling for RF sensing nodes with multiple antenna/antenna panels to enable multi-panel/multi-antenna activation for the RF sensing nodes, such that each antenna/antenna panel of an RF sensing node (e.g., a UE, a TRP, a vehicle UE, etc.) may be activated independent of each other. Aspects presented herein may also enable an RF sensing node to use multiple antennas/antenna panels for UL sensing reference signal transmissions and receptions, which may be referred to as multi-panel operations or multi-panel sensing operations for purposes of the present disclosure.

Figure 9:
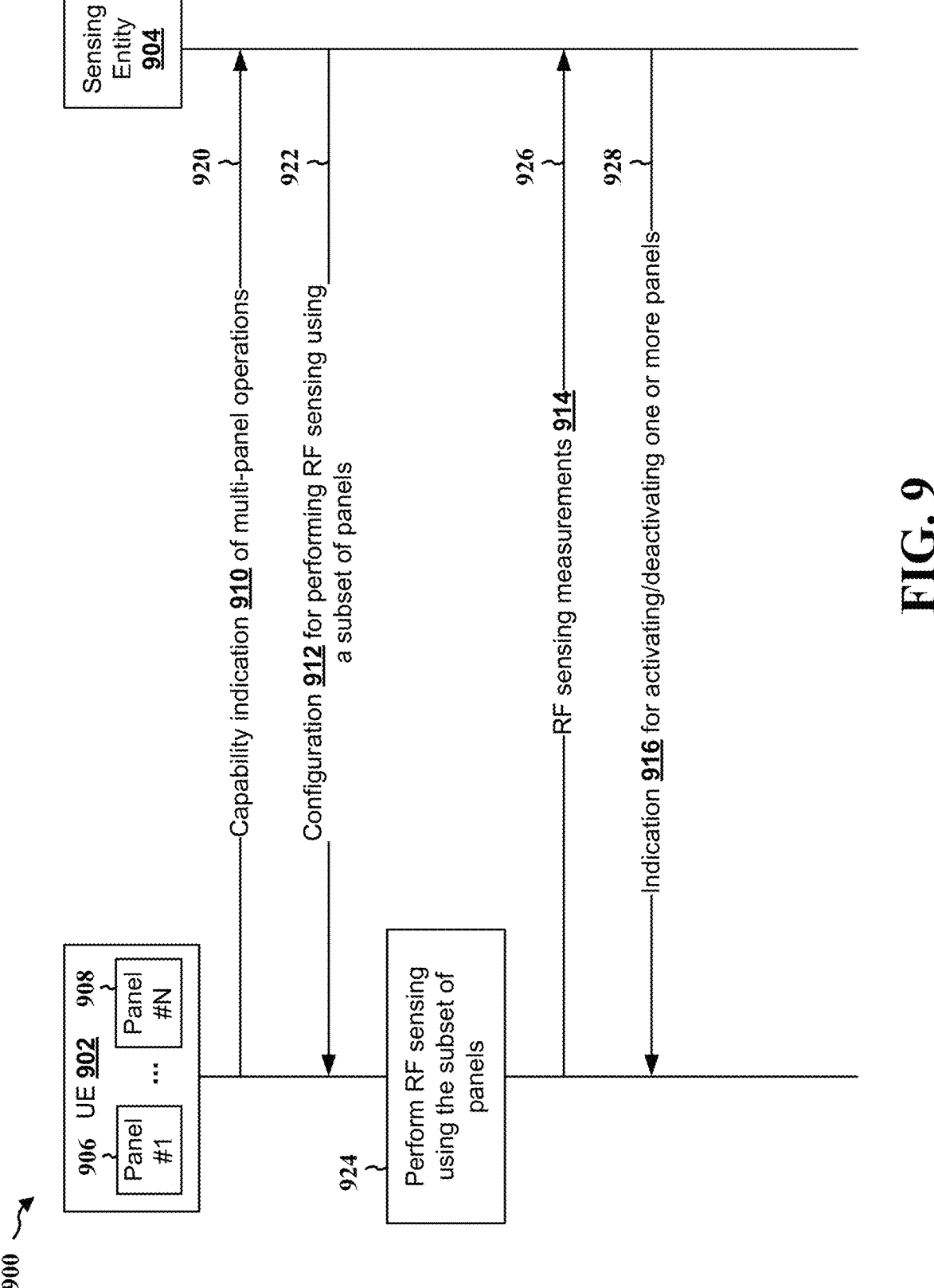
FIG. 9 is a communication flow illustrating an example configuration and signaling for multi-panel operations in accordance with various aspects of the present disclosure.

FIG. 9 is a communication flow 900 illustrating an example configuration and signaling for multi-panel operations in accordance with various aspects of the present disclosure. The numberings associated with the communication flow 900 do not specify a particular temporal order and are merely used as references for the communication flow 900. For purposes of the present disclosure, a sensing UE may refer to a UE or a device with multiple antennas/ antenna panels capable of performing RF sensing using multiple antennas/antenna panels. In some examples, the distance between at least two antennas/antenna panels in the multiple antennas/antenna panels of the sensing UE may be specified to have a minimum distance (e.g., X meters, Y feet, etc.) for an improved sensing performance. On the other hand, a sensing entity may refer to a core network entity that is responsible for or capable of managing and coordinating sensing sessions for sensing UEs. Examples of a sensing entity may include a base station (e.g., a gNB), an anchor UE, a TRP, a roadside unit (RSU), etc. Note that a sensing UE may refer to a UE that participates in a sensing session, whereas an anchor UE may refer to a UE that does not participate in the sensing session, but may collect sensing measurements (e.g., from the sensing UE) and perform sensing computations. A sensing session (which may also be referred to as an RF sensing session) may refer to a period of time or an occasion in which at least one sensing UE is configured to perform RF sensing. For example, a sensing session may be an instance/occasion where a sensing UE is configured to transmit a set of RRS and receive the set of RRS reflected from one or more objects. In another example, a sensing session may be a duration (e.g., 10 minutes) where a sensing UE is configured to continuously transmitting sets of RRS and receive the sets of RRS reflected from one or more objects until the duration expires.

At 920, a UE 902 (e.g., a sensing UE) that is capable of supporting/performing multi-panel sensing operations may indicate its capability for the multi-panel operations (e.g., the capability to perform RF sensing using multiple antennas/antenna panels) to a sensing entity 904, such as via a capability indication 910 (e.g., a capability indication message). In one example, the capability indication 910 may include a number of antenna panels available at the UE 902. For example, if the UE 902 includes a first antenna panel 906 and up to an N$^{th}$ antenna panel 908, the capability indication 910 may include that the UE 902 has N antennas/antenna panels. In some examples, the UE 902 may transmit the capability indication 910 based on a request from the sensing entity 904 (e.g., the sensing entity 904 is seeking for a UE to perform multi-panel operations), and/or the UE 902 may transmit the capability indication 910 to request a configuration from the sensing entity 904 for performing the multi-panel operations.

In another example, the capability indication 910 may include a panel identification (ID) for each antenna/antenna panel. For example, the first antenna panel 906 may be associated with a first panel ID (panel #1) and the N$^{th}$ antenna panel 908 may be associated with a second panel ID (panel #N), etc.

In another example, the capability indication 910 may include a maximum number of antennas/antenna panels that can be used simultaneously by the UE 902. For example, the UE 902 may have four antennas/antenna panels (e.g., N=4). However, the UE 902 may just be able to activate/use at most two antennas/antenna panels at a time (e.g., at the same time, simultaneously, etc.).

In another example, the capability indication 910 may include at least one timing offset between different antenna panels. For example, due to difference in hardware configurations and/or components used (e.g., different panels may be driven by different oscillators), there may be a timing offset (e.g., 5 ms, 10 ms, etc.) between the first antenna panel 906 and the N$^{th}$ antenna panel 908 in transmitting and/or receiving signals (e.g., RRS).

In another example, the capability indication 910 may include a relative geometric location of antenna panels. For example, the capability indication 910 may indicate that the first antenna panel 906 is located at the front of the UE 902, the N$^{th}$ antenna panel 908 is located at the rear of the UE 902, the distance between the first antenna panel 906 and the N$^{th}$ antenna panel 908 is X meters/feet, and/or the relative distance/direction of one antenna/antenna panel with respect to another antenna/antenna panel (e.g., a reference antenna/ antenna panel), etc.

At 922, based on the capability indication 910, the sensing entity 904 may transmit a configuration 912 to the UE 902 that configures the UE 902 to perform RF sensing using at least a subset of its antennas/antenna panels, where each antenna/antenna panel in the subset of antennas/antenna panels may be configured to perform a corresponding (or independent) RF sensing operation. For example, if the UE 902 has four antennas/antenna panels (e.g., N=4), the configuration 912 may configure the UE 902 to use just two antennas/antenna panels, and each of the two antennas/ antenna panels may be configured to perform an independent (and different) RF sensing operation. Thus, the corresponding RF sensing operation for each antenna/antenna panel may be at least partially different from a particular RF sensing operation for at least one other antenna/antenna panel in the subset of antennas/antenna panels.

In one example, an RF sensing operation may include the UE 902 performing a set of RF sensing measurements, where the RF sensing measurements may include generating a range map, a Doppler map, a point cloud (e.g., a collection of 3D points in space that collectively represent the surface or structure of an object or a scene), an angle map, or a combination thereof. In another example, the configuration 912 may configure each antenna/antenna panel in the subset of antennas/antenna panels to perform a specified set of RF sensing measurements. For example, the configuration 912 may configure the first antenna panel 906 to perform RF sensing measurement based on a range-Doppler map (and using a first set of RRS and/or a first set of sensing configurations) and configure the N$^{th}$ antenna panel 908 to perform RF sensing measurement based on an angle map (and using a second set of RRS and/or a second set of sensing configurations), etc. As such, each antennas/antenna panels in the subset of antennas/antenna panels may be configured to perform at least one RF sensing measurement that is at least partially different from each other. In another example, an RF sensing operation may include transmitting a set of reference signals, receiving a set of reference signals, or both (e.g., depending on whether the RF sensing is based on monostatic sensing mode or bistatic sensing mode as described in connection with FIGS. 6A and 6B).

In another example, the configuration 912 may configure each antenna/antenna panel in the subset of antennas/antenna panels with a specific set of reference signal resources. For example, reference signal resources for different antennas/antenna panels (in the subset of antennas/antenna panels) may be associated with different sensing frequency layers (SFLs) or different positioning frequency layers (PFLs). For purposes of the present disclosure, a positioning frequency layer (PFL) (or a "frequency layer" in some examples) may refer to a collection of one or more PRS resource sets across one or more TRPs that have the same values for certain parameters. A PFL may include one or more TRPs, and each TRP in the one or more TRPs may include one or more resource sets, and each resource set in the one or more resource sets may include one or more PRs resources, etc. In some examples, the collection of PRS resource sets may have the same subcarrier spacing and cyclic prefix (CP) type (e.g., meaning all numerologies supported for PDSCHs are also supported for PRS), the same value of the downlink PRS bandwidth, the same start PRB (and center frequency), and/or the same comb-size, etc. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer. In some implementations, the concept of a PFL may be similar to a component carrier (CC) and a BWP, where CCs and BWPs may be used by one base station (or a macro cell base station and a small cell base station) to transmit data channels, while PFLs may be used by multiple (e.g., three or more) base stations to transmit PRS.

A UE may indicate the number of PFLs it is capable of supporting when the UE sends the network its positioning capabilities, such as during a positioning protocol session. For example, a UE may indicate whether it is capable of supporting one, two, three, or four PFLs. Similarly, a sensing frequency layer (SFL) may refer to a collection of one or more sensing resource sets across one or more sensing devices/nodes that have the same values for certain parameters.

At 924, based on the configuration 912, the UE 902 may perform the RF sensing via each antenna/antenna panel in the subset of antennas/antenna panels. Then, at 926, the UE 902 may transmit RF sensing measurements 914 (e.g., obtained from the RF sensing) to the sensing entity 904. In one example, the RF sensing measurements may include a panel identification (ID) for each antenna/antenna panel in the subset of antennas/antenna panels used for RF sensing.

In one example, as described in connection with FIGS. 5 and 6A, when the UE 902 performs the RF sensing via each antenna/antenna panel in the subset of antennas/antenna panels, the UE 902 may transmit a set of reference signals (e.g., RRS) via each antenna/antenna panel in the subset of antennas/antenna panels, and the UE 902 may receive the corresponding set of reference signals reflected from one or more objects via each antenna/antenna panel in the subset of antennas/antenna panels.

In some scenarios, as shown at 928, during a sensing operation or a sensing session, the sensing entity 904 may determine to activate or deactivate certain antenna(s)/antenna panel(s) at the UE 902, such for improving the sensing operation/session accuracy and performance. For example, an object to be detected by the UE 902 may be moved from the front of the UE 902 to the back of the UE 902. Thus, it may be more suitable for the UE 902 to perform the RF sensing using the rear panel compared to the front panel, such as described in connection with FIG. 7. Thus, the sensing entity 904 may transmit an indication 916 to activate and/or deactivate one or more panels at the UE 902 (e.g., activate the rear panel if it is not activated and/or deactivate the front panel). In one example, the sensing entity 904 may transmit the indication 916 via downlink control information (DCI), a medium access control (MAC)-control element (MAC-CE), radio resource control (RRC) signaling, an upper layer protocol, a sensing protocol, or a combination thereof.

In another aspect of the present disclosure, the transmission and/or reception of the sensing reference signals (e.g., RRS) may be based on on-demand (e.g., upon a request from one entity). For example, a set of downlink (DL) signals may be configured to be on-demand (which may be referred to as "on-demand DL signal"), where the UE 902 may request (the sensing entity 904 to provide) a DL sensing reference signal per panel. For example, the UE 902 may specify that different DL reference signals (RS) to be used/configured for each of its antennas/antenna panels (that are to be used for the multi-panel sensing operations). In response, the UE 902 may receive different DL sensing reference signals via different antenna panels based on the request (e.g., configured by the sensing entity 904).

Similarly, a set of uplink (UL) may also be configured to be on-demand (which may be referred to as "on-demand UL signal"). For example, for UE-based RF sensing sessions (e.g., the UE performs the RF sensing and estimates the location of one or more objects detected), the UE 902 may request the sensing entity 904 to assign/configure UL resources to be used for the RF sensing per panel (e.g., for transmitting reference signals per antenna/antenna panel). In response, based on the request, the sensing entity 904 may configure UL resources for each panel of the UE. In some examples, this request may be useful for SL RF sensing sessions where the UE 902 may transmit reference sensing signals and other UE(s) and/or TRP(s) may be configured to monitor these specified reference sensing signals. In other words, the UE 902 may receive, from the sensing entity 904 based on the request, different UL resource allocations for different antenna panels. A resource allocation may refer to assigning/scheduling of time and/or frequency resource(s) for a transmission (or a reception). For example, an UL resource allocation may refer to scheduling of a time and frequency resource for a UE to transmit an UL transmission.

Aspects described above may improve performance and accuracy of multi-panel sensing operations for a UE. In one aspect, a UE may be configured to perform RF sensing measurements using a subset of its panels (e.g., may be based on panel ID, panel groups), which may include which RF signal transmissions per panel, activation/deactivation per panel (via DCI/MAC-CE/RRC or upper layer), and/or on-demand DL/UL RF sensing, etc. In another aspect, a sensing UE may indicate, to a sensing entity, its capability of multi-panel operations (e.g., number of different antenna panels, max number of panels that can be used simultaneously, timing offset between the panels, relative geometric location of the different antenna panel with regards to a reference antenna panel).

FIG. 10 is a flowchart 1000 of a method of wireless communication. The method may be performed by a UE (e.g., the UE 104, 404, 902; the vehicle UE 702, 802, 808; the apparatus 1104). The method may improve the performance and/or the accuracy of multi-panel sensing operations for the UE by enabling the UE to perform RF sensing using multiple antennas/antenna panels.

At 1002, the UE may transmit, to a sensing entity, an indication of a capability to perform RF sensing using a set of antenna panels, such as described in connection with FIG. 9. For example, at 920, the UE 902 (e.g., a sensing UE) that is capable of supporting/performing multi-panel sensing operations may indicate its capability for the multi-panel operations (e.g., the capability to perform RF sensing using multiple antennas/antenna panels) to a sensing entity 904, such as via a capability indication 910 (e.g., a capability indication message). The transmission of the indication may be performed by, e.g., the multi-panel sensing operation component 198, the transceiver(s) 1122, the RF sensor module 1140, the cellular baseband processor(s) 1124, and/or the application processor(s) 1106 of the apparatus 1104 in FIG. 11.

In one example, the sensing entity may be a core network entity that is capable of managing or coordinating RF sensing sessions, a base station, an anchor UE, or an RSU.

In another example, the indication may include at least one of: a number of antenna panels available at the UE, a panel ID for each antenna panel in the set of antenna panels, a maximum number of antenna panels that can be used simultaneously, at least one timing offset between different antenna panels, or a relative geometric location of antenna panels.

At 1004, the UE may receive, from the sensing entity based on the indication, a configuration to perform an RF sensing operation using a subset of antenna panels in the set of antenna panels, where each antenna panel in the subset of antenna panels may be configured to perform a corresponding RF sensing operation for each antenna panel, such as described in connection with FIG. 9. For example, at 922, based on the capability indication 910, the UE 902 may receive a configuration 912 from the sensing entity 904 that configures the UE 902 to perform RF sensing using at least a subset of its antennas/antenna panels, where each antenna/antenna panel in the subset of antennas/antenna panels may be configured to perform a corresponding (or independent) RF sensing operation. The reception of the configuration may be performed by, e.g., the multi-panel sensing operation component 198, the transceiver(s) 1122, the RF sensor module 1140, the cellular baseband processor(s) 1124, and/or the application processor(s) 1106 of the apparatus 1104 in FIG. 11.

In one example, the corresponding RF sensing operation for each antenna panel may be at least partially different from a particular RF sensing operation for at least one other antenna panel in the subset of antenna panels.

In another example, the RF sensing operation may include generating a range map, a Doppler map, an angle map, a point cloud, or a combination thereof.

In another example, the configuration may configure each antenna panel in the subset of antenna panels to perform a specified set of RF sensing measurements. In some implementations, different antenna panels in the subset of antenna panels may be configured to perform at least one RF sensing measurement that is at least partially different from each other.

In another example, the configuration may configure each antenna panel in the subset of antenna panels with a specific set of reference signal resources. In some implementations, reference signal resources for at least one antenna panel in the subset of antenna panels may be associated with a different sensing frequency layer (SFL) or a different positioning frequency layer (PFL) than at least one other antenna panel in the subset of antenna panels.

At 1006, the UE may perform, based on the configuration, the RF sensing operation via each antenna panel in the subset of antenna panels, such as described in connection with FIG. 9. For example, at 924, based on the configuration 912, the UE 902 may perform the RF sensing via each antenna/antenna panel in the subset of antennas/antenna panels. The RF sensing operation may be performed by, e.g., the multi-panel sensing operation component 198, the transceiver(s) 1122, the RF sensor module 1140, the cellular baseband processor(s) 1124, and/or the application processor(s) 1106 of the apparatus 1104 in FIG. 11.

In another example, the UE may transmit to the sensing entity, a second indication of a set of RF sensing measurements. In some implementations, the set of RF sensing measurements may include a panel identification (ID) for each antenna panel in the subset of antenna panels.

In another example, to performing the RF sensing via each antenna panel in the subset of antenna panels, the UE may transmit a set of reference signals via each antenna panel in the subset of antenna panels. In some implementations, the UE may receive corresponding set of reference signals reflected from one or more objects via each antenna panel in the subset of antenna panels.

In another example, the UE may receive a second indication to activate or deactivate at least one antenna panel in the set of antenna panels or in the subset of antenna panels. In some implementations, to receive the second indication, the UE may receive the second indication via DCI, a MAC-CE, RRC signaling, an upper layer protocol, a sensing protocol, or a combination thereof.

In another example, the UE may transmit, to the sensing entity, a request to provide DL sensing reference signals per antenna panel, and the UE may receive different DL sensing reference signals via different antenna panels based on the request.

In another example, the UE may transmit, to the sensing entity, a request to provide UL resources for transmitting reference signals per antenna panel. In some implementations, the UE may receive, from the sensing entity based on the request, different UL resource allocations for different antenna panels.

Figure 11:
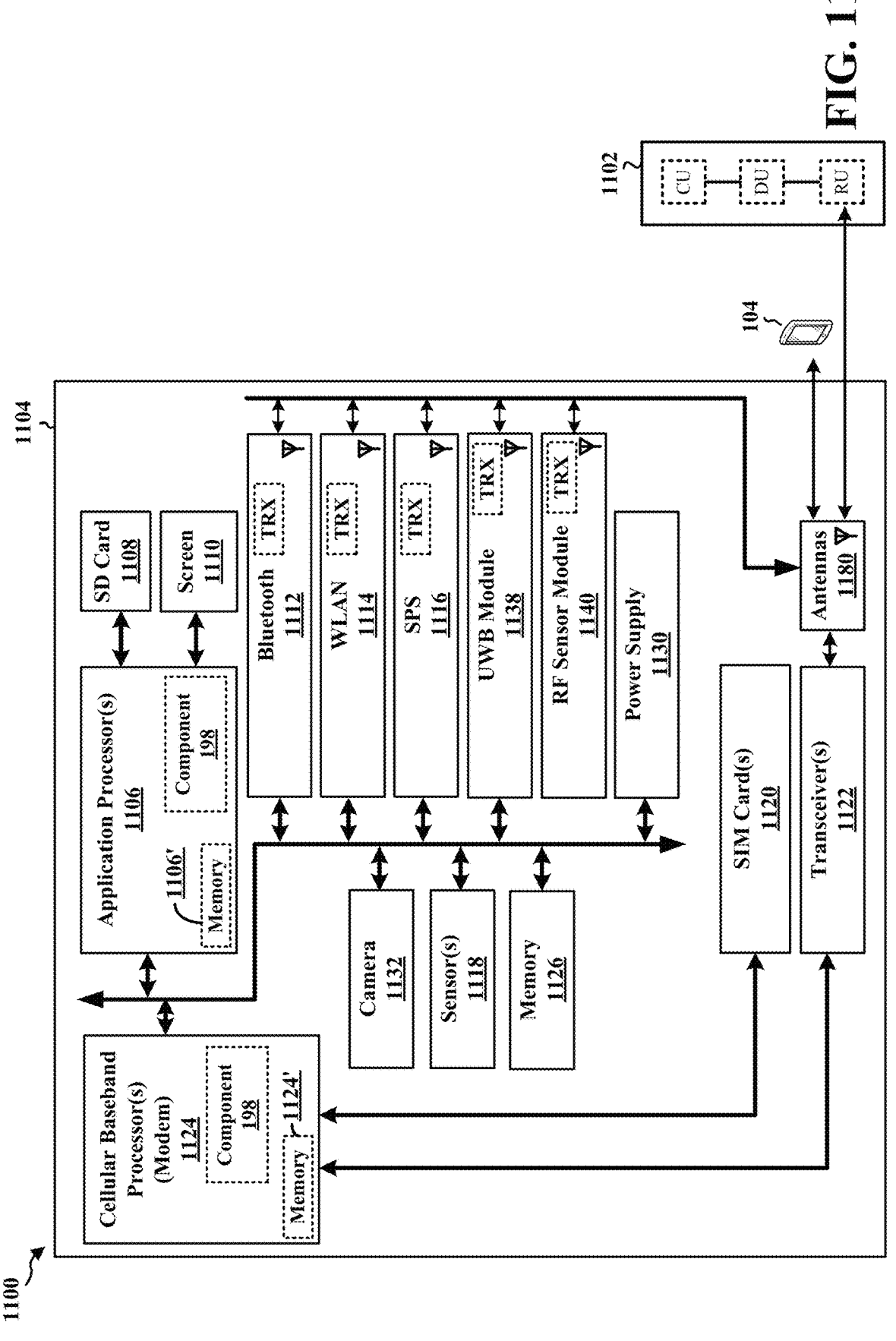
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor 1124 (also referred to as a modem) coupled to one or more transceivers 1122 (e.g., cellular RF transceiver). The cellular baseband processor(s) 1124 may include at least one on-chip memory 1124'. In some aspects, the apparatus 1104 may further include one or more subscriber identity modules (SIM) cards 1120 and at least one application processor 1106 coupled to a secure digital (SD) card 1108 and a screen 1110. The application processor(s) 1106 may include on-chip memory 1106'. In some aspects, the apparatus 1104 may further include a Bluetooth module 1112, a WLAN module 1114, an ultrawideband (UWB) module 1138, an RF sensor module 1140, an SPS module 1116 (e.g., GNSS module), one or more sensor modules 1118 (e.g., barometric pressure sensor/altimeter; ultrawide band (UWB) sensor, motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, the UWB module 1138, the RF sensor module 1140, and the SPS module 1116 may include an on-chip transceiver (TRX) (or in some cases, just a receiver (RX)). The Bluetooth module 1112, the WLAN module 1114, the UWB module 1138, the RF sensor module 1140, and the SPS module 1116 may include their own dedicated antennas and/or utilize the antennas 1180 for communication. The cellular baseband processor(s) 1124 communicates through the transceiver(s) 1122 via one or more antennas 1180 with the UE 104 and/or with an RU associated with a network entity 1102. The cellular baseband processor(s) 1124 and the application processor(s) 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor(s) 1124 and the application processor(s) 1106 are each responsible for general processing, including the execution of software stored on the computer-readable medium/memory. The software, when executed by the cellular baseband processor(s) 1124/application processor(s) 1106, causes the cellular baseband processor(s) 1124/application processor(s) 1106 to perform the various functions described supra. The computer-readable medium/memory may also be used for storing data that is manipulated by the cellular baseband processor(s) 1124/application processor(s) 1106 when executing software. The cellular baseband processor(s) 1124/application processor(s) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) 1124 and/or the application processor(s) 1106, and in another configuration, the apparatus 1104 may be the entire UE (e.g., see UE 350 of FIG. 3) and include the additional modules of the apparatus 1104.

As discussed supra, the multi-panel sensing operation component 198 may be configured to transmit, to a sensing entity, an indication of a capability to perform RF sensing using a set of antenna panels. The multi-panel sensing operation component 198 may also be configured to receive, from the sensing entity based on the indication, a configuration to perform an RF sensing operation using a subset of antenna panels in the set of antenna panels, where each antenna panel in the subset of antenna panels is configured to perform a corresponding RF sensing operation for each antenna panel. The multi-panel sensing operation component 198 may also be configured to perform, based on the configuration, the RF sensing operation via each antenna panel in the subset of antenna panels. The multi-panel sensing operation component 198 may be within the cellular baseband processor(s) 1124, the application processor(s) 1106, or both the cellular baseband processor(s) 1124 and the application processor(s) 1106. The multi-panel sensing operation component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) 1124 and/or the application processor(s) 1106, may include means for transmitting, to a sensing entity, an indication of a capability to perform RF sensing using a set of antenna panels. The apparatus 1104 may further include means for receiving, from the sensing entity based on the indication, a configuration to perform an RF sensing operation using a subset of antenna panels in the set of antenna panels, where each antenna panel in the subset of antenna panels is configured to perform a corresponding RF sensing operation for each antenna panel. The apparatus 1104 may further include means for performing, based on the configuration, the RF sensing operation via each antenna panel in the subset of antenna panels.

In one configuration, the sensing entity may be a core network entity that is capable of managing or coordinating RF sensing sessions, a base station, an anchor UE, or an RSU.

In another configuration, the indication may include at least one of: a number of antenna panels available at the UE, a panel ID for each antenna panel in the set of antenna panels, a maximum number of antenna panels that can be used simultaneously, at least one timing offset between different antenna panels, or a relative geometric location of antenna panels.

In another configuration, the corresponding RF sensing operation for each antenna panel may be at least partially different from a particular RF sensing operation for at least one other antenna panel in the subset of antenna panels.

In another configuration, the RF sensing operation may include generating a range map, a Doppler map, an angle map, a point cloud, or a combination thereof.

In another configuration, the configuration may configure each antenna panel in the subset of antenna panels to perform a specified set of RF sensing measurements. In some implementations, different antenna panels in the subset of antenna panels may be configured to perform at least one RF sensing measurement that is at least partially different from each other.

In another configuration, the configuration may configure each antenna panel in the subset of antenna panels with a specific set of reference signal resources. In some implementations, reference signal resources for at least one antenna panel in the subset of antenna panels may be associated with a different SFL or a different PFL than at least one other antenna panel in the subset of antenna panels.

In another configuration, the apparatus 1104 may further include means for transmitting to the sensing entity, a second indication of a set of RF sensing measurements. In some implementations, the set of RF sensing measurements may include a panel ID for each antenna panel in the subset of antenna panels.

In another configuration, the means for performing the RF sensing via each antenna panel in the subset of antenna panels may include configuring the apparatus 1104 to transmit a set of reference signals via each antenna panel in the subset of antenna panels, and/or to receive corresponding set of reference signals reflected from one or more objects via each antenna panel in the subset of antenna panels.

In another configuration, the apparatus 1104 may further include means for receiving a second indication to activate or deactivate at least one antenna panel in the set of antenna panels or in the subset of antenna panels. In some implementations, the means for receiving the second indication may include configuring the apparatus 1104 to receive the second indication via DCI, a MAC-CE, RRC signaling, an upper layer protocol, a sensing protocol, or a combination thereof.

In another configuration, the apparatus 1104 may further include means for transmitting, to the sensing entity, a request to provide DL sensing reference signals per antenna panel, and means for receiving different DL sensing reference signals via different antenna panels based on the request.

In another configuration, the apparatus 1104 may further include means for transmitting, to the sensing entity, a request to provide UL resources for transmitting reference signals per antenna panel. In some implementations, the apparatus 1104 may further include means for receiving, from the sensing entity based on the request, different UL resource allocations for different antenna panels.

The means may be the multi-panel sensing operation component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 12 is a flowchart 1200 of a method of wireless communication. The method may be performed by a sensing entity (e.g., the base station 102; the sensing entity 904; the network entity 1102, 1302). The method may enable the sensing entity to configure multi-panel sensing operations for a UE, such that the UE may perform RF sensing using multiple antennas/antenna panels to improve the accuracy and performance of the RF sensing.

At 1202, the sensing entity may receive, from a UE, an indication of a capability to perform RF sensing using a set of antenna panels, such as described in connection with FIG. 9. For example, at 920, the sensing entity 904 may receive a capability indication 910 from the UE 902 that indicates the UE 902 (e.g., a sensing UE) is capable of supporting/performing multi-panel sensing operations. The reception of the indication may be performed by, e.g., the sensing operation configuration component 199, the RU processor(s) 1342, and/or the transceiver(s) 1346 of the network entity 1302 in FIG. 13.

In one example, the sensing entity may be a core network entity that is capable of managing or coordinating RF sensing sessions, a base station, an anchor UE, or an RSU.

In another example, the indication may include at least one of: a number of antenna panels available at the UE, a panel ID for each antenna panel in the set of antenna panels, a maximum number of antenna panels that can be used simultaneously, at least one timing offset between different antenna panels, or a relative geometric location of antenna panels.

At 1204, the sensing entity may transmit, to the UE based on the indication, a configuration to perform an RF sensing operation using a subset of antenna panels in the set of antenna panels, where each antenna panel in the subset of antenna panels is configured to perform a corresponding RF sensing operation for each antenna panel, such as described in connection with FIG. 9. For example, at 922, based on the capability indication 910, the sensing entity 904 may transmit a configuration 912 to the UE 902 that configures the UE 902 to perform RF sensing using at least a subset of its antennas/antenna panels, where each antenna/antenna panel in the subset of antennas/antenna panels may be configured to perform a corresponding (or independent) RF sensing operation. The transmission of the configuration may be performed by, e.g., the sensing operation configuration component 199, the RU processor(s) 1342, and/or the transceiver(s) 1346 of the network entity 1302 in FIG. 13.

In one example, the corresponding RF sensing operation for each antenna panel may be at least partially different from a particular RF sensing operation for at least one other antenna panel in the subset of antenna panels.

In another example, the RF sensing operation may include generating a range map, a Doppler map, an angle map, a point cloud, or a combination thereof.

In another example, the configuration may configure each antenna panel in the subset of antenna panels to perform a specified set of RF sensing measurements.

In another example, different antenna panels in the subset of antenna panels may be configured to perform at least one RF sensing measurement that is at least partially different from each other.

In another example, the configuration may configure each antenna panel in the subset of antenna panels with a specific set of reference signal resources. In some implementations, reference signal resources for at least one antenna panel in the subset of antenna panels may be associated with a different SFL or a different PFL than at least one other antenna panel in the subset of antenna panels.

In another example, the sensing entity may receive, from the UE, a second indication of a set of RF sensing measurements. In some implementations, the set of RF sensing measurements may include a panel ID for each antenna panel in the subset of antenna panels.

In another example, the sensing entity may transmit a second indication to activate or deactivate at least one antenna panel in the set of antenna panels or in the subset of antenna panels. In some implementations, to transmit the second indication, the sensing entity may transmit the second indication via DCI, a MAC-CE, RRC signaling, an upper layer protocol, a sensing protocol, or a combination thereof.

In another example, the sensing entity may receive, from the UE, a request to provide DL sensing reference signals per antenna panel, and configure, for the UE based on the request, different DL sensing reference signals for different antenna panels of the UE.

In another example, the sensing entity may receive, from the UE, a request to provide UL resources for transmitting reference signals per antenna panel, and configure, for the UE based on the request, different UL resource allocations for different antenna panels of the UE.

Figure 13:
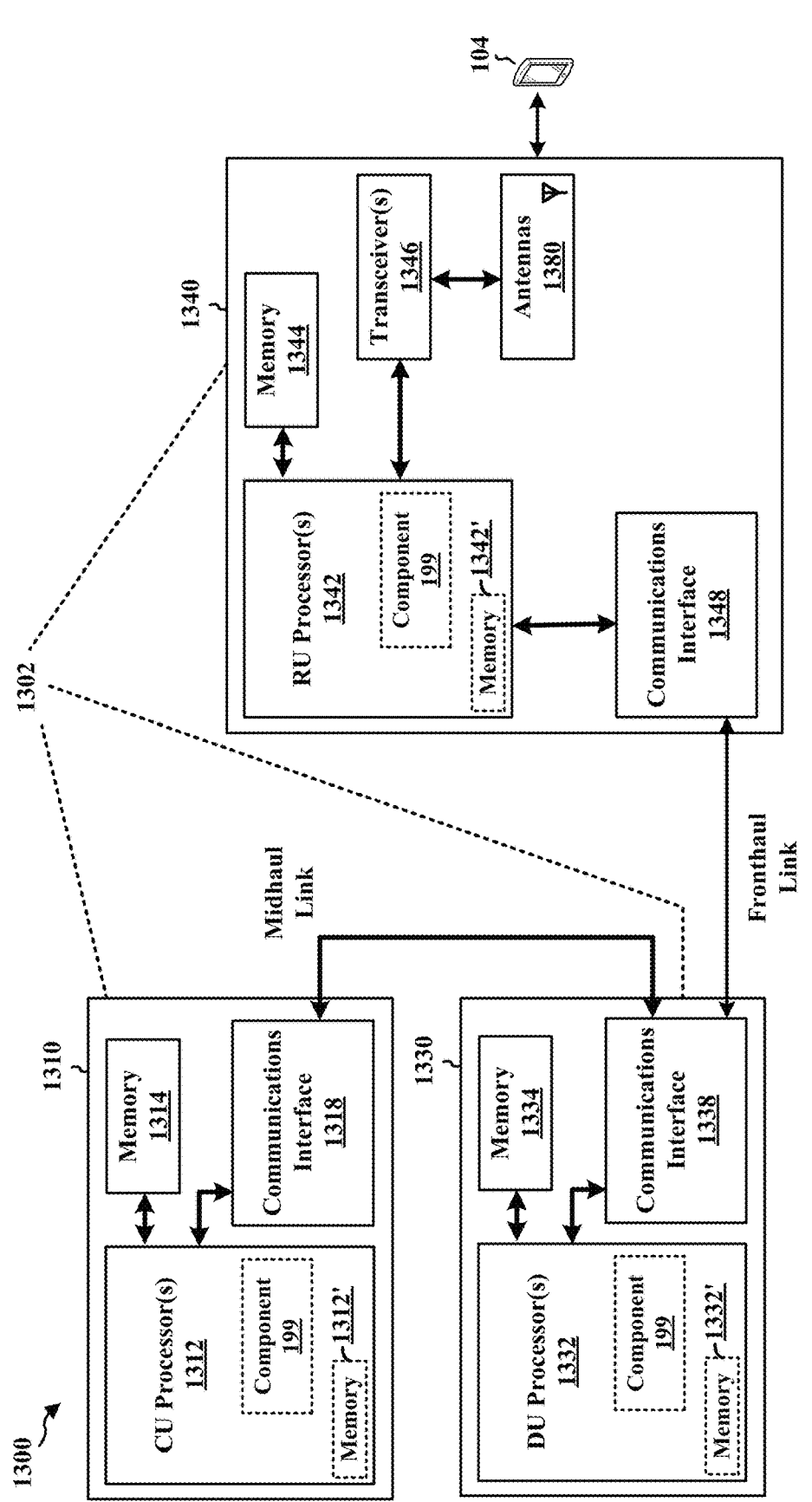
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the sensing operation configuration component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the sensing operation configuration component 199 may be configured to receive, from a UE, an indication of a capability to perform RF sensing using a set of antenna panels. The sensing operation configuration component 199 may also be configured to transmit, to the UE based on the indication, a configuration to perform an RF sensing operation using a subset of antenna panels in the set of antenna panels, where each antenna panel in the subset of antenna panels is configured to perform a corresponding RF sensing operation for each antenna panel. The sensing operation configuration component 199 may be within one or more processors of one or more of the CU 1310, DU 1330, and the RU 1340. The sensing operation configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 may include means for receiving, from a UE, an indication of a capability to perform RF sensing using a set of antenna panels. The network entity 1302 may further include means for transmitting, to the UE based on the indication, a configuration to perform an RF sensing operation using a subset of antenna panels in the set of antenna panels, where each antenna panel in the subset of antenna panels is configured to perform a corresponding RF sensing operation for each antenna panel.

In one configuration, the network entity 1302 may be a core network entity that is capable of managing or coordinating RF sensing sessions, a base station, an anchor UE, or an RSU.

In another configuration, the indication may include at least one of: a number of antenna panels available at the UE, a panel ID for each antenna panel in the set of antenna panels, a maximum number of antenna panels that can be used simultaneously, at least one timing offset between different antenna panels, or a relative geometric location of antenna panels.

In one configuration, the corresponding RF sensing operation for each antenna panel may be at least partially different from a particular RF sensing operation for at least one other antenna panel in the subset of antenna panels.

In another configuration, the RF sensing operation may include generating a range map, a Doppler map, an angle map, a point cloud, or a combination thereof.

In another configuration, the configuration may configure each antenna panel in the subset of antenna panels to perform a specified set of RF sensing measurements.

In another configuration, different antenna panels in the subset of antenna panels may be configured to perform at least one RF sensing measurement that is at least partially different from each other.

In another configuration, the configuration may configure each antenna panel in the subset of antenna panels with a specific set of reference signal resources. In some implementations, reference signal resources for at least one antenna panel in the subset of antenna panels may be associated with a different SFL or a different PFL than at least one other antenna panel in the subset of antenna panels.

In another configuration, the network entity 1302 may further include means for receiving, from the UE, a second indication of a set of RF sensing measurements. In some implementations, the set of RF sensing measurements may include a panel ID for each antenna panel in the subset of antenna panels.

In another configuration, the network entity 1302 may further include means for transmitting a second indication to activate or deactivate at least one antenna panel in the set of antenna panels or in the subset of antenna panels. In some implementations, the second indication may be transmitted via DCI, a MAC-CE, RRC signaling, an upper layer protocol, a sensing protocol, or a combination thereof.

In another configuration, the network entity 1302 may further include means for receiving, from the UE, a request to provide DL sensing reference signals per antenna panel, and means for configuring, for the UE based on the request, different DL sensing reference signals for different antenna panels of the UE.

In another configuration, the network entity 1302 may further include means for receiving, from the UE, a request to provide UL resources for transmitting reference signals per antenna panel, and means for configuring, for the UE based on the request, different UL resource allocations for different antenna panels of the UE.

The means may be the sensing operation configuration component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: transmitting, to a sensing entity, an indication of a capability to perform radio frequency (RF) sensing using a set of antenna panels; receiving, from the sensing entity based on the indication, a configuration to perform an RF sensing operation using a subset of antenna panels in the set of antenna panels, wherein each antenna panel in the subset of antenna panels is configured to perform a corresponding RF sensing operation for each antenna panel; and performing, based on the configuration, the RF sensing operation via each antenna panel in the subset of antenna panels.

Aspect 2 is the method of aspect 1, wherein the corresponding RF sensing operation for each antenna panel is at least partially different from a particular RF sensing operation for at least one other antenna panel in the subset of antenna panels.

Aspect 3 is the method of aspect 1 or aspect 2, wherein the sensing entity is a core network entity that is capable of managing or coordinating RF sensing sessions, a base station, an anchor UE, or a roadside unit (RSU).

Aspect 4 is the method of any of aspects 1 to 3, wherein the indication includes at least one of: a number of antenna panels available at the UE, a panel identification (ID) for each antenna panel in the set of antenna panels, a maximum number of antenna panels that can be used simultaneously, at least one timing offset between different antenna panels, or a relative geometric location of antenna panels.

Aspect 5 is the method of any of aspects 1 to 4, wherein the RF sensing operation includes generating a range map, a Doppler map, an angle map, a point cloud, or a combination thereof.

Aspect 6 is the method of any of aspects 1 to 5, wherein the configuration configures each antenna panel in the subset of antenna panels to perform a specified set of RF sensing measurements.

Aspect 7 is the method of any of aspects 1 to 6, wherein different antenna panels in the subset of antenna panels are configured to perform at least one RF sensing measurement that is at least partially different from each other.

Aspect 8 is the method of any of aspects 1 to 7, wherein the configuration configures each antenna panel in the subset of antenna panels with a specific set of reference signal resources.

Aspect 9 is the method of any of aspects 1 to 8, wherein reference signal resources for at least one antenna panel in the subset of antenna panels is associated with a different sensing frequency layer (SFL) or a different positioning frequency layer (PFL) than at least one other antenna panel in the subset of antenna panels.

Aspect 10 is the method of any of aspects 1 to 9, further comprising: transmitting, to the sensing entity, a second indication of a set of RF sensing measurements.

Aspect 11 is the method of any of aspects 1 to 10, wherein the set of RF sensing measurements includes a panel identification (ID) for each antenna panel in the subset of antenna panels.

Aspect 12 is the method of any of aspects 1 to 11, wherein performing the RF sensing via each antenna panel in the subset of antenna panels comprises: transmitting a set of reference signals via each antenna panel in the subset of antenna panels.

Aspect 13 is the method of any of aspects 1 to 12, further comprising: receiving corresponding set of reference signals reflected from one or more objects via each antenna panel in the subset of antenna panels.

Aspect 14 is the method of any of aspects 1 to 13, further comprising: receiving a second indication to activate or deactivate at least one antenna panel in the set of antenna panels or in the subset of antenna panels.

Aspect 15 is the method of any of aspects 1 to 14, wherein receiving the second indication comprises receiving the second indication via downlink control information (DCI), a medium access control (MAC)-control element (MAC-CE), radio resource control (RRC) signaling, an upper layer protocol, a sensing protocol, or a combination thereof.

Aspect 16 is the method of any of aspects 1 to 15, further comprising: transmitting, to the sensing entity, a request to provide downlink (DL) sensing reference signals per antenna panel; and receiving different DL sensing reference signals via different antenna panels based on the request.

Aspect 17 is the method of any of aspects 1 to 16, further comprising: transmitting, to the sensing entity, a request to provide uplink (UL) resources for transmitting reference signals per antenna panel.

Aspect 18 is the method of any of aspects 1 to 17, further comprising: receiving, from the sensing entity based on the request, different UL resource allocations for different antenna panels.

Aspect 19 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 1 to 18.

Aspect 20 is the apparatus of aspect 19, further including at least one of a transceiver or an antenna coupled to the at least one processor.

Aspect 21 is an apparatus for wireless communication including means for implementing any of aspects 1 to 18.

Aspect 22 is a computer-readable medium (e.g., a non-transitory computer-readable medium) storing computer executable code, where the code when executed by a processor causes the processor to implement any of aspects 1 to 18.

Aspect 23 is a method of wireless communication at a sensing entity, comprising: receiving, from a user equipment (UE), an indication of a capability to perform radio frequency (RF) sensing using a set of antenna panels; and transmitting, to the UE based on the indication, a configuration to perform an RF sensing operation using a subset of antenna panels in the set of antenna panels, wherein each antenna panel in the subset of antenna panels is configured to perform a corresponding RF sensing operation for each antenna panel.

Aspect 24 is the method of aspect 23, wherein the corresponding RF sensing operation for each antenna panel is at least partially different from a particular RF sensing operation for at least one other antenna panel in the subset of antenna panels.

Aspect 25 is the method of aspect 23 or aspect 24, wherein the sensing entity is a core network entity that is capable of managing or coordinating RF sensing sessions, a base station, an anchor UE, or a roadside unit (RSU).

Aspect 26 is the method of any of aspects 23 to 25, wherein the indication includes at least one of: a number of antenna panels available at the UE, a panel identification (ID) for each antenna panel in the set of antenna panels, a maximum number of antenna panels that can be used simultaneously, at least one timing offset between different antenna panels, or a relative geometric location of antenna panels.

Aspect 27 is the method of any of aspects 23 to 26, wherein the RF sensing operation includes generating a range map, a Doppler map, an angle map, a point cloud, or a combination thereof.

Aspect 28 is the method of any of aspects 23 to 27, wherein the configuration configures each antenna panel in the subset of antenna panels to perform a specified set of RF sensing measurements.

Aspect 29 is the method of any of aspects 23 to 28, wherein different antenna panels in the subset of antenna panels are configured to perform at least one RF sensing measurement that is at least partially different from each other.

Aspect 30 is the method of any of aspects 23 to 29, wherein the configuration configures each antenna panel in the subset of antenna panels with a specific set of reference signal resources.

Aspect 31 is the method of any of aspects 23 to 30, wherein reference signal resources for at least one antenna panel in the subset of antenna panels is associated with a different sensing frequency layer (SFL) or a different positioning frequency layer (PFL) than at least one other antenna panel in the subset of antenna panels.

Aspect 32 is the method of any of aspects 23 to 31, further comprising: receiving, from the UE, a second indication of a set of RF sensing measurements.

Aspect 33 is the method of any of aspects 23 to 32, wherein the set of RF sensing measurements includes a panel identification (ID) for each antenna panel in the subset of antenna panels.

Aspect 34 is the method of any of aspects 23 to 33, further comprising: transmitting a second indication to activate or deactivate at least one antenna panel in the set of antenna panels or in the subset of antenna panels.

Aspect 35 is the method of any of aspects 23 to 34, wherein transmitting the second indication comprises transmitting the second indication via downlink control information (DCI), a medium access control (MAC)-control element (MAC-CE), radio resource control (RRC) signaling, an upper layer protocol, a sensing protocol, or a combination thereof.

Aspect 36 is the method of any of aspects 23 to 35, further comprising: receiving, from the UE, a request to provide downlink (DL) sensing reference signals per antenna panel; and configuring, for the UE based on the request, different DL sensing reference signals for different antenna panels of the UE.

Aspect 37 is the method of any of aspects 23 to 36, further comprising: receiving, from the UE, a request to provide uplink (UL) resources for transmitting reference signals per antenna panel; and configuring, for the UE based on the request, different UL resource allocations for different antenna panels of the UE.

Aspect 38 is an apparatus for wireless communication at a sensing entity, including: at least one memory; and at least one processor coupled to the at least one memory and, based at least in part on information stored in the at least one memory, the at least one processor, individually or in any combination, is configured to implement any of aspects 23 to 37.

Aspect 39 is the apparatus of aspect 38, further including at least one of a transceiver or an antenna coupled to the at least one processor.

Aspect 40 is an apparatus for wireless communication including means for implementing any of aspects 23 to 37.

Aspect 41 is a computer-readable medium (e.g., a non-transitory computer-readable medium) storing computer executable code, where the code when executed by a processor causes the processor to implement any of aspects 23 to 37.

What is claimed is:

1. An apparatus for wireless communication at a user equipment (UE), comprising:
   a transceiver;
   at least one memory; and
   at least one processor coupled to the at least one memory and, based at least in part on information stored in the at least one memory, the at least one processor, individually or in any combination, is configured to:

transmit, to a sensing entity, an indication of a capability to perform radio frequency (RF) sensing using a set of antenna panels;

receive, from the sensing entity based on the indication, a configuration to perform an RF sensing operation using a subset of antenna panels in the set of antenna panels, wherein each antenna panel in the subset of antenna panels is configured to perform a corresponding RF sensing operation for each antenna panel; and perform, based on the configuration, the RF sensing operation via each antenna panel in the subset of antenna panels.

2. The apparatus of claim 1, wherein the corresponding RF sensing operation for each antenna panel is at least partially different from a particular RF sensing operation for at least one other antenna panel in the subset of antenna panels.

3. The apparatus of claim 1, wherein the sensing entity is a core network entity that is capable of managing or coordinating RF sensing sessions, a base station, an anchor UE, or a roadside unit (RSU).

4. The apparatus of claim 1, wherein the indication includes at least one of:

a number of antenna panels available at the UE, a panel identification (ID) for each antenna panel in the set of antenna panels, a maximum number of antenna panels that can be used simultaneously, at least one timing offset between different antenna panels, or a relative geometric location of antenna panels.

5. The apparatus of claim 1, wherein the RF sensing operation includes generating a range map, a Doppler map, an angle map, a point cloud, or a combination thereof.

6. The apparatus of claim 1, wherein the configuration configures each antenna panel in the subset of antenna panels to perform a specified set of RF sensing measurements.

7. The apparatus of claim 6, wherein different antenna panels in the subset of antenna panels are configured to perform at least one RF sensing measurement that is at least partially different from each other.

8. The apparatus of claim 1, wherein the configuration configures each antenna panel in the subset of antenna panels with a specific set of reference signal resources.

9. The apparatus of claim 8, wherein reference signal resources for at least one antenna panel in the subset of antenna panels is associated with a different sensing frequency layer (SFL) or a different positioning frequency layer (PFL) than at least one other antenna panel in the subset of antenna panels.

10. The apparatus of claim 1, wherein the at least one processor, individually or in any combination, is further configured to:

transmit, to the sensing entity, a second indication of a set of RF sensing measurements.

11. The apparatus of claim 10, wherein the set of RF sensing measurements includes a panel identification (ID) for each antenna panel in the subset of antenna panels.

12. The apparatus of claim 1, wherein to perform the RF sensing via each antenna panel in the subset of antenna panels, the at least one processor, individually or in any combination, is configured to:

transmit a set of reference signals via each antenna panel in the subset of antenna panels.

13. The apparatus of claim 12, wherein the at least one processor, individually or in any combination, is further configured to:

receive a corresponding set of reference signals reflected from one or more objects via each antenna panel in the subset of antenna panels.

14. The apparatus of claim 1, wherein the at least one processor, individually or in any combination, is further configured to:

receive a third indication to activate or deactivate at least one antenna panel in the set of antenna panels or in the subset of antenna panels.

15. The apparatus of claim 14, wherein to receive the third indication, the at least one processor, individually or in any combination, is configured to:

receive the third indication via downlink control information (DCI), a medium access control (MAC)-control element (MAC-CE), radio resource control (RRC) signaling, an upper layer protocol, a sensing protocol, or a combination thereof.

16. The apparatus of claim 1, wherein the at least one processor, individually or in any combination, is further configured to:

transmit, to the sensing entity, a request to provide downlink (DL) sensing reference signals per antenna panel; and receive different DL sensing reference signals via different antenna panels based on the request.

17. The apparatus of claim 1, wherein the at least one processor, individually or in any combination, is further configured to:

transmit, to the sensing entity, a request to provide uplink (UL) resources for transmitting reference signals per antenna panel.

18. The apparatus of claim 17, wherein the at least one processor, individually or in any combination, is further configured to:

receive, from the sensing entity based on the request, different UL resource allocations for different antenna panels.

19. A method of wireless communication at a user equipment (UE), comprising:

transmitting, to a sensing entity, an indication of a capability to perform radio frequency (RF) sensing using a set of antenna panels;

receiving, from the sensing entity based on the indication, a configuration to perform an RF sensing operation using a subset of antenna panels in the set of antenna panels, wherein each antenna panel in the subset of antenna panels is configured to perform a corresponding RF sensing operation for each antenna panel; and performing, based on the configuration, the RF sensing operation via each antenna panel in the subset of antenna panels.

20. An apparatus for wireless communication at a sensing entity, comprising:

a transceiver;

at least one memory; and at least one processor coupled to the at least one memory and, based at least in part on information stored in the at least one memory, the at least one processor, individually or in any combination, is configured to:

receive, from a user equipment (UE), an indication of a capability to perform radio frequency (RF) sensing using a set of antenna panels; and transmit, to the UE based on the indication, a configuration to perform an RF sensing operation using a subset of antenna panels in the set of antenna panels, wherein each antenna panel in the subset of antenna panels is configured to perform a corresponding RF sensing operation for each antenna panel.

21. The apparatus of claim 20, wherein the corresponding RF sensing operation for each antenna panel is at least partially different from a particular RF sensing operation for at least one other antenna panel in the subset of antenna panels.

22. The apparatus of claim 20, wherein the indication includes at least one of:

a number of antenna panels available at the UE, a panel identification (ID) for each antenna panel in the set of antenna panels, a maximum number of antenna panels that can be used simultaneously, at least one timing offset between different antenna panels, or a relative geometric location of antenna panels.

23. The apparatus of claim 20, wherein the RF sensing operation includes generating a range map, a Doppler map, an angle map, a point cloud, or a combination thereof.

24. The apparatus of claim 20, wherein the configuration configures each antenna panel in the subset of antenna panels to perform a specified set of RF sensing measurements.

25. The apparatus of claim 20, wherein the configuration configures each antenna panel in the subset of antenna panels with a specific set of reference signal resources.

26. The apparatus of claim 20, wherein the at least one processor, individually or in any combination, is further configured to:

receive, from the UE, a second indication of a set of RF sensing measurements.

27. The apparatus of claim 20, wherein the at least one processor, individually or in any combination, is further configured to:

transmit a second indication to activate or deactivate at least one antenna panel in the set of antenna panels or in the subset of antenna panels.

28. The apparatus of claim 20, wherein the at least one processor, individually or in any combination, is further configured to:

receive, from the UE, a request to provide downlink (DL) sensing reference signals per antenna panel; and configure, for the UE based on the request, different DL sensing reference signals for different antenna panels of the UE.

29. The apparatus of claim 20, wherein the at least one processor, individually or in any combination, is further configured to:

receive, from the UE, a request to provide uplink (UL) resources for transmitting reference signals per antenna panel; and configure, for the UE based on the request, different UL resource allocations for different antenna panels of the UE.

30. A method of wireless communication at a sensing entity, comprising:

receiving, from a user equipment (UE), an indication of a capability to perform radio frequency (RF) sensing using a set of antenna panels; and transmitting, to the UE based on the indication, a configuration to perform an RF sensing operation using a subset of antenna panels in the set of antenna panels, wherein each antenna panel in the subset of antenna panels is configured to perform a corresponding RF sensing operation for each antenna panel.

* * * * *